US012651951B2

(12) United States Patent
Ikemi et al.

(10) Patent No.: US 12,651,951 B2
(45) Date of Patent: Jun. 9, 2026

(54) MAGNETIC GEARED ROTATING MACHINE, POWER GENERATION SYSTEM, AND DRIVE SYSTEM

(71) Applicants: MITSUBISHI HEAVY INDUSTRIES, LTD., Tokyo (JP); MAGNOMATICS LIMITED, Sheffield (GB)

(72) Inventors: Takeshi Ikemi, Tokyo (JP); Ryoji Okabe, Tokyo (JP); Takatoshi Matsushita, Tokyo (JP); Mikito Sasaki, Tokyo (JP); Stuart Calverley, Sheffield (GB); David Powell, Sheffield (GB); Glynn Cooke, Sheffield (GB); Radu-Stefan Dragan, Sheffield (GB)

(73) Assignees: MITSUBISHI HEAVY INDUSTRIES, LTD., Tokyo (JP); MAGNOMATICS LIMITED, Sheffield (GB)

( * ) Notice: Subject to any disclaimer, the term of this patent is extended or adjusted under 35 U.S.C. 154(b) by 219 days.

(21) Appl. No.: 18/562,541

(22) PCT Filed: Aug. 12, 2022

(86) PCT No.: PCT/JP2022/030724
§ 371 (c)(1),
(2) Date: Nov. 20, 2023

(87) PCT Pub. No.: WO2023/042587
PCT Pub. Date: Mar. 23, 2023

(65) Prior Publication Data
US 2024/0235360 A1     Jul. 11, 2024

(30) Foreign Application Priority Data
Sep. 14, 2021     (JP) ................................. 2021-149617

(51) Int. Cl.
*H02K 49/10*          (2006.01)

(52) U.S. Cl.
CPC .................................. *H02K 49/102* (2013.01)

(58) Field of Classification Search
CPC ...... H02K 49/102; H02K 49/10; H02K 21/16; H02K 16/02; H02K 7/10; H02K 1/22; H02K 1/278; H02K 1/24; F16H 49/00
(Continued)

(56) References Cited

U.S. PATENT DOCUMENTS

2010/0283345 A1    11/2010  Atallah et al.
2011/0012458 A1*    1/2011  Atallah .................. H02K 51/00
                                                                      310/103
(Continued)

FOREIGN PATENT DOCUMENTS

| JP | 10-23692 A | 1/1998 |
| JP | 2013-106401 A | 5/2013 |
| JP | 5643857 B2 | 11/2014 |
| JP | 2021-112945 A | 8/2021 |
| JP | 2021-118595 A | 8/2021 |

OTHER PUBLICATIONS

Extended European Search Report for European Application No. 22869734.8, dated Oct. 4, 2024.
(Continued)

*Primary Examiner* — Michael Andrews
(74) *Attorney, Agent, or Firm* — Birch, Stewart, Kolasch & Birch, LLP

(57) ABSTRACT

A magnetic geared rotating machine includes: a stator; a rotor including a plurality of rotor magnets; and a magnetic pole piece rotor including a plurality of magnetic pole pieces each disposed at a radial position between the stator and the rotor. Each of the magnetic pole pieces has a magnetic pole piece end face facing one side in an axial direction. Each of the rotor magnets has a rotor magnet end face facing the one side. At least part of the magnetic pole piece end face is located on the other side in the axial direction relative to the rotor magnet end face, or a finger end face, of each of a
(Continued)

plurality of fingers, facing the one side is located on the other side relative to a tooth end face, of a tooth of the stator, facing the one side, the plurality of fingers being configured to hold therebetween a stator magnet disposed on the tooth from both sides in a circumferential direction.

10 Claims, 11 Drawing Sheets

(58) Field of Classification Search
USPC ................................................. 310/103, 104
See application file for complete search history.

(56) References Cited

U.S. PATENT DOCUMENTS

| | | | |
|---|---|---|---|
| 2018/0269770 A1* | 9/2018 | Powell ................. | H02K 49/102 |
| 2019/0157962 A1* | 5/2019 | Powell ................... | H02K 16/02 |
| 2023/0046584 A1* | 2/2023 | Okabe ................... | H02K 16/02 |
| 2023/0047288 A1 | 2/2023 | Matsushita et al. | |

OTHER PUBLICATIONS

English translation of the International Preliminary Report on Patentability and Written Opinion of the International Searching Authority for International Application No. PCT/JP2022/030724, dated Mar. 28, 2024.

* cited by examiner

Radial direction

Circumferential direction

Dimension La1/Dimension Lr [%]

Dimension La1: axial distance from magnetic pole piece end face
to rotor magnet end face Dimension Lr: axial length of rotor magnet Dimension La1: axial distance from magnetic pole piece end face
to rotor magnet end face Dimension Ls: opposing distance between magnetic pole piece and rotor Dimension Lt1: axial distance from finger end face to tooth end face Dimension Le: axial length of tooth Dimension Lt1: axial distance from finger end face to tooth end face
Dimension Lw: tip width of tooth

MAGNETIC GEARED ROTATING MACHINE, POWER GENERATION SYSTEM, AND DRIVE SYSTEM

TECHNICAL FIELD

The present disclosure relates to a magnetic geared rotating machine, a power generation system, and a drive system.

This application claims the priority of Japanese Patent Application No. 2021-149617 filed on Sep. 14, 2021, the content of which is incorporated herein by reference.

BACKGROUND

Conventionally, a magnetic geared rotating machine is known which converts a rotation speed between two rotors to transmit a torque. For example, a magnetic geared rotating machine disclosed in Patent Document 1 includes, in order from a radially inner side, an inner rotor for supporting a plurality of permanent magnets, an external rotor including a plurality of magnetic pole pieces, and a stator. The stator is provided with a plurality of windings and a plurality of stator magnets. If the internal rotor rotates due to a rotating magnetic field generated in response to a three-phase alternating current flowing in the windings, a magnetic flux generated from the permanent magnets of the internal rotor is modulated by the magnetic pole pieces. The external rotor is rotated by the modulated magnetic field and the magnetic field of the stator magnets.

CITATION LIST

Patent Literature

Patent Document 1: JP5643857B

SUMMARY

Technical Problem

In order for a magnetic geared rotating machine to operate efficiently, for example, it is preferable to suppress an eddy current loss in a stator, a magnetic pole piece, and the like.

The object of the present disclosure is to provide a magnetic geared rotating machine, a power generation system, and a drive system, in which an eddy current loss is suppressed.

Solution to Problem

A magnetic geared rotating machine according to at least one embodiment of the present invention, includes: a stator; a rotor including a plurality of rotor magnets; and a magnetic pole piece rotor including a plurality of magnetic pole pieces each disposed at a radial position between the stator and the rotor. Each of the magnetic pole pieces has a magnetic pole piece end face facing one side in an axial direction. Each of the rotor magnets has a rotor magnet end face facing the one side. At least either of two relationships is established, one relationship being a relationship where at least part of the magnetic pole piece end face is located on the other side in the axial direction relative to the rotor magnet end face, and the other relationship being a relationship where a finger end face, of each of a plurality of fingers, facing the one side is located on the other side relative to a tooth end face, of a tooth of the stator, facing the one side, the plurality of fingers being configured to hold therebetween a stator magnet disposed on the tooth from both sides in a circumferential direction.

A power generation system according to at least one embodiment of the present invention, includes: a prime mover; and the above-described magnetic geared rotating machine which serves as a magnetic geared generator configured to be driven by an input from the prime mover to generate electric power.

A drive system according to at least one embodiment of the present invention, includes: the above-described magnetic geared rotating machine which serves as a magnetic geared motor configured to output rotational power; and a drive part configured to be driven by the rotational power output from the magnetic geared rotating machine.

Advantageous Effects

According to the present disclosure, it is possible to provide a magnetic geared rotating machine, a power generation system, and a drive system, in which an eddy current loss is suppressed.

DETAILED DESCRIPTION

Figure 1A:
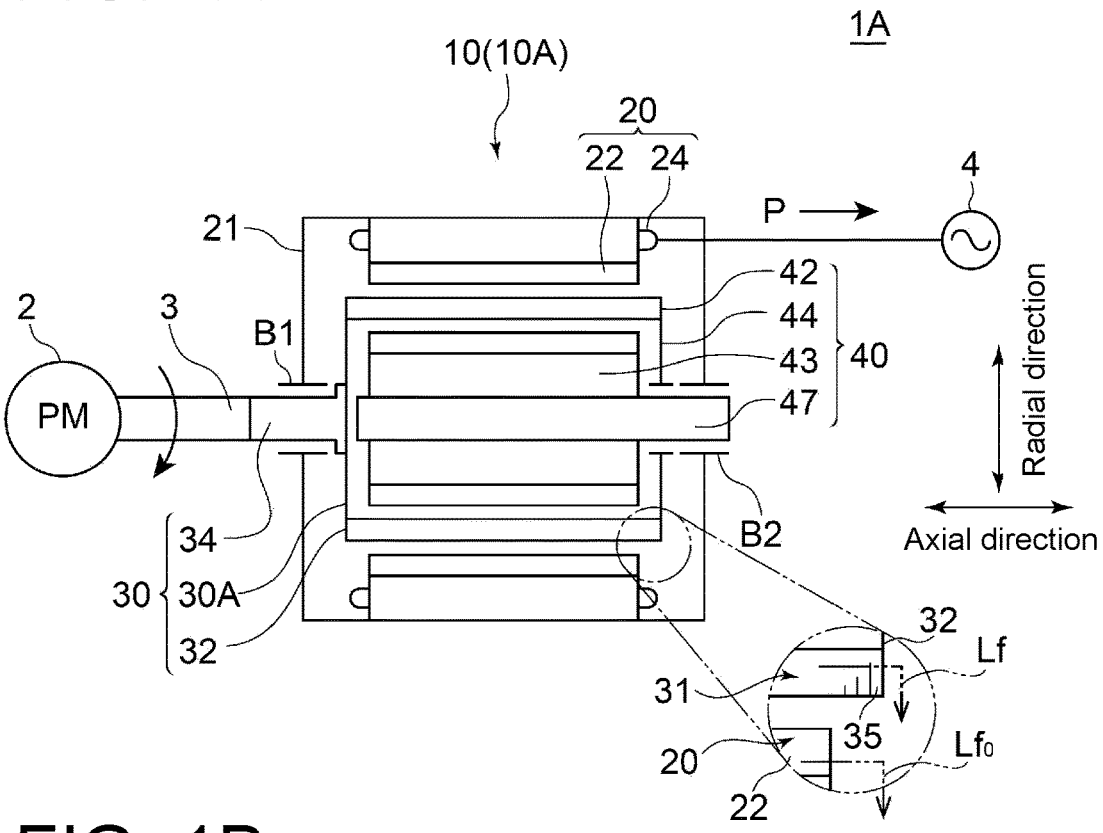
FIG. 1A is a schematic view showing a magnetic geared rotating machine according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

(Overview of Magnetic Geared Rotating Machine 10)

Figure 1B:
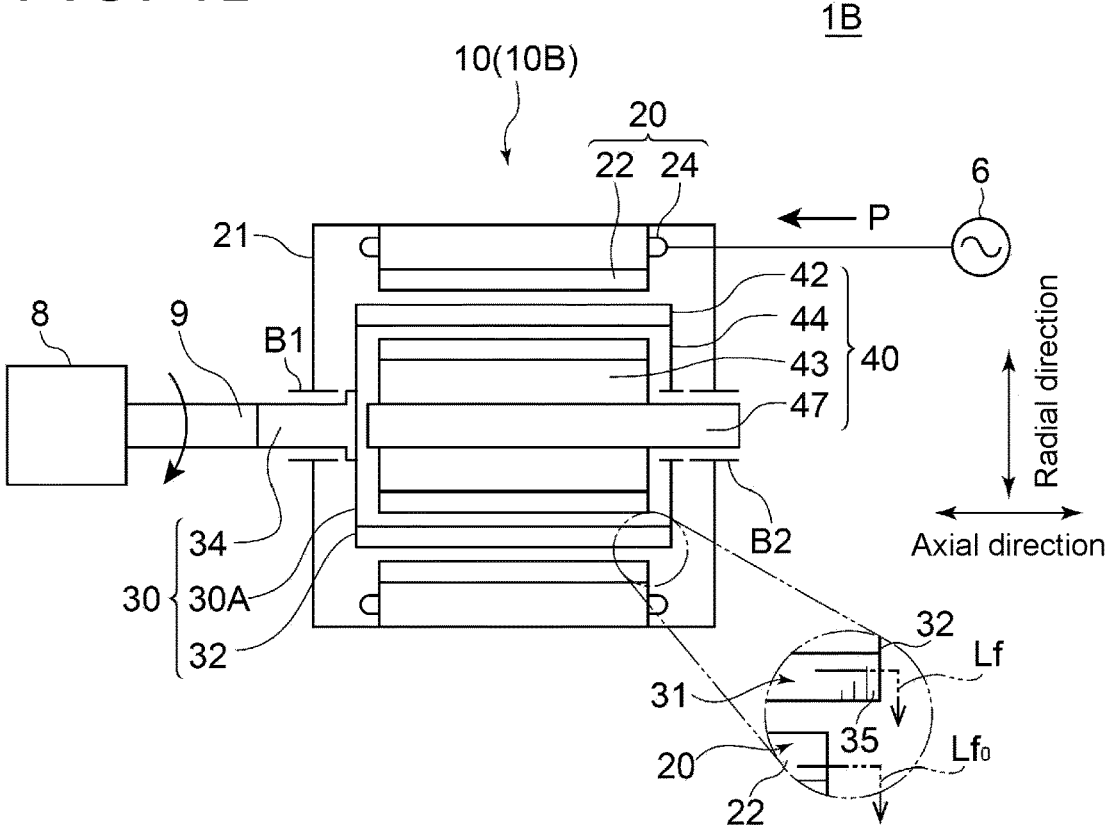
FIG. 1B is a schematic view showing a magnetic geared rotating machine according to another embodiment.

FIGS. 1A and 1B are each a schematic view showing an example of a magnetic geared rotating machine. Herein, in FIGS. 1A and 1B, the "axial direction" is a direction parallel to a rotational axis of a magnetic pole piece rotor 30 and a rotor 40 of a magnetic geared rotating machine 10, and the "radial direction" is a direction orthogonal to the rotational axis of the rotor 40 and a magnetic pole piece rotor 30.

In an embodiment, as shown in FIG. 1A, the magnetic geared rotating machine 10 is a magnetic geared generator 10A configured to be driven by an input from a prime mover 2 to generate electric power. The magnetic geared generator 10A is configured to supply electric power P generated by the power generation to a power supply destination 4 which may be, for example, a power grid.

In another embodiment, as shown in FIG. 1B, the magnetic geared rotating machine 10 is a magnetic geared motor 10B configured to drive a drive part 8 upon receiving the electric power P supplied from a power supply source 6 which may be, for example, a power grid.

In the embodiment shown in FIG. 1A, the magnetic geared generator 10A constitutes part of a power generation system 1A. The power generation system 1A may be, for example, a renewable energy power generation system such as a wind power generation system or a tidal current power generation system. If the power generation system 1A is a wind power generation system, the prime mover 2 is a wind turbine rotor. If the power generation system 1A is a tidal current power generation system, the prime mover 2 is a water turbine rotor.

The magnetic geared generator 10A includes the stator 20 including a plurality of stator magnets 22 and a plurality of stator windings 24, the magnetic pole piece rotor 30 including a plurality of magnetic pole pieces 31, and a rotor 40 including a plurality of rotor magnets 42. In the example shown in FIG. 1A, the stator 20 is disposed inside a housing 21 for rotatably supporting the magnetic pole piece rotor 30 and the rotor 40. The magnetic pole piece rotor 30 is configured to rotate with the rotational shaft 3 of the prime mover 2. Each of the plurality of magnetic pole pieces 31 disposed at a radial position between the stator 20 and the rotor 40 includes a plurality of axially laminated electrical steel sheets 35. The magnetic pole piece rotor 30 includes end plates 30A respectively disposed at axial both ends of the magnetic pole piece 31, and a power transmission shaft 34 for transmitting rotational power to and from the prime mover 2. The power transmission shaft 34 of the present example is connected to the rotational shaft 3 of the prime mover 2 and is also connected to the one end plate 30A. The power transmission shaft 34 is rotatably supported by the housing 21 via a bearing B1. As rotational power is transmitted (input) from the rotational shaft 3 of the prime mover 2 to the power transmission shaft 34, the magnetic pole piece rotor 30 rotates integrally with the rotational shaft 3. The rotor 40 includes a rotor core 43 provided with the plurality of rotor magnets 42, end plates 44 respectively disposed at axial both ends of the rotor core 43, and a rotational shaft 47 extending axially on a radially inner side of the rotor core 43. The rotational shaft 47 is rotatably supported by the housing 21 via a bearing B2.

In the embodiment shown in FIG. 1A, the magnetic geared generator 10A has a configuration in which the stator 20, the magnetic pole piece rotor 30, and the rotor 40 are arranged in order toward the radially inner side. In another embodiment, the magnetic geared generator 10A has a configuration in which the rotor 40, the magnetic pole piece rotor 30, and the stator 20 are arranged in order toward the radially inner side.

The above-described magnetic geared generator 10A has a structure in which a magnetic gear and a generator are integrated, and is configured to convert a mechanical input from the prime mover 2 into electric power by utilizing a harmonic type magnetic gear principle and electromagnetic induction.

For example, power generation in the magnetic geared generator 10A may be performed according to the following principle. A magnetic flux of the stator magnet 22 is modulated by the magnetic pole piece 31 of the magnetic pole piece rotor (low-speed rotor) 30 rotating together with the rotational shaft 3 of the prime mover 2, and the rotor magnet 42 receives a magnetic force from the modulated magnetic field, thereby rotating the rotor (high-speed rotor) 40. At this time, the ratio (speed increasing ratio) of the rotation speed of the rotor 40 to the magnetic pole piece rotor 30 is expressed by a ratio of the number of magnetic poles $N_L$ of the magnetic pole piece 31 to the number of pole pairs $N_H$ of the rotor magnet 42 ($=N_L/N_H$). When the rotor 40 rotates, an electric current is generated in the stator winding 24 by electromagnetic induction. The number of magnetic poles $N_L$ of the magnetic pole piece 31 is greater than the number of pole pairs $N_S$ of the stator magnet 22.

During operation of the magnetic geared generator 10A, various magnetic fluxes such as an $N_H$-order magnetic flux (main magnetic flux) and a harmonic magnetic flux of higher-order than $N_H$-order (for example, an $N_H+N_S$-order magnetic flux) can occur inside the magnetic geared generator 10A. Some of these magnetic fluxes become leakage magnetic fluxes Lf axially passing through the magnetic pole pieces 31 in order to avoid the stator magnets 22, for example. If the leakage magnetic flux Lf is generated, an eddy current can be generated in the in-plane direction in each electrical steel sheet 35. Relatively large eddy currents can be generated in the electrical steel sheets 35 disposed in, for example, axial both end portions of the magnetic pole piece 31.

Further, during operation of the magnetic geared generator 10A, a magnetic flux $Lf_0$ generated due to, for example, the stator magnet 22 may axially pass through the stator 20 described later with reference to FIG. 2 (teeth 26 described later as a more specific example). Consequently, eddy currents may be generated in axial both end portions of the stator 20. The eddy currents generated in the stator 20 may also be generated when, for example, a magnetic flux generated due to the rotor magnet 42 or a magnetic flux generated due to energization of the stator winding 24 passes through the stator core 23.

In the embodiment shown in FIG. 1B, the magnetic geared motor 10B constitutes part of a drive system 1B. The drive system 1B including the drive part 8 is driven by the magnetic geared motor 10B as a drive source. As an example, the drive system 1B may be a vehicle running by using the magnetic geared motor 10B as a rotational power source, and in this case, the rotational shaft 9 of the drive part 8 may be a drive shaft for transmitting rotational power to wheels.

The basic configuration of the magnetic geared motor 10B is common to the magnetic geared generator 10A shown in FIG. 1A. That is, the magnetic geared motor 10B includes the stator 20 including the plurality of stator magnets 22 and the plurality of stator windings 24, the magnetic pole piece rotor 30 including the plurality of magnetic pole pieces 31, and the rotor 40 including the plurality of rotor magnets 42.

In the example shown in FIG. 1B, the stator 20 is fixed to the inside of the housing 21 for rotatably supporting the magnetic pole piece rotor 30 and the rotor 40. Each of the plurality of magnetic pole pieces 31 disposed at the radial position between the stator 20 and the rotor 40 includes the plurality of axially laminated electrical steel sheets 35. The magnetic pole piece rotor 30 includes the end plates 30A respectively disposed at the axial both ends of the magnetic pole piece 31, and the power transmission shaft 34 for transmitting rotational power to and from the drive part 8. The power transmission shaft 34 of the present example is connected to the rotational shaft 9 of the drive part 8 and is also connected to the one end plate 30A. The power transmission shaft 34 is rotatably supported by the housing 21 via the bearing B1. The rotational power generated in the magnetic geared motor 10B is transmitted (output) from the power transmission shaft 34 to the rotational shaft 9 of the drive part 8, thereby rotating the shaft 3B and operating the drive part 8. The rotor 40 includes the rotor core 43 provided with the plurality of rotor magnets 42, the end plates 44 respectively disposed at the axial both ends of the rotor core 43, and the rotational shaft 47 extending axially on the radially inner side of the rotor core 43. The rotational shaft 47 is rotatably supported by the housing 21 via the bearing B2.

In the embodiment shown in FIG. 1B, the magnetic geared motor 10B has the configuration in which the stator 20, the magnetic pole piece rotor 30, and the rotor 40 are arranged in order toward the radially inner side. In another embodiment, the magnetic geared motor 10B has the configuration in which the rotor 40, the magnetic pole piece rotor 30, and the stator 20 are arranged in order toward the radially inner side.

The magnetic geared motor 10B has a structure in which the magnetic gear and the motor are integrated, and rotates the rotor (high-speed rotor) 40 by a rotating magnetic field generated by energizing the stator winding 24. Rotational power transmission from the rotor 40 to the magnetic pole piece rotor (low-speed rotor) 30 utilizes the principle of a harmonic magnetic gear. The rotational power output from the operating magnetic geared motor 10B is transmitted to the rotational shaft 9, thereby driving the drive part 8.

During operation of the magnetic geared motor 10B, the axial leakage magnetic flux Lf may be generated in the magnetic pole piece 31, as in the magnetic geared generator 10A. In this case, an eddy current may be generated in the in-plane direction in each magnetic pole piece 31. Relatively large eddy currents may be generated in the electrical steel sheets 35 disposed in, for example, axial both end portions of the magnetic pole piece 31.

Further, during operation of the magnetic geared motor 10B, the magnetic flux $Lf_0$ generated due to, for example, the stator magnet 22 may axially pass through the stator 20 (the teeth 26 described later as the more specific example). Consequently, the eddy currents may be generated in the axial both end portions of the stator 20. The eddy currents generated in the stator 20 may also be generated when, for example, the magnetic flux generated due to the rotor magnet 42 or the magnetic flux generated due to energization of the stator winding 24 passes through the stator 20.

(Internal Structure of Magnetic Geared Electrical Machine)

Subsequently, an internal structure of the above-described magnetic geared rotating machine 10 (10A, 10B) will be described with reference to FIG. 2.

Figure 2:
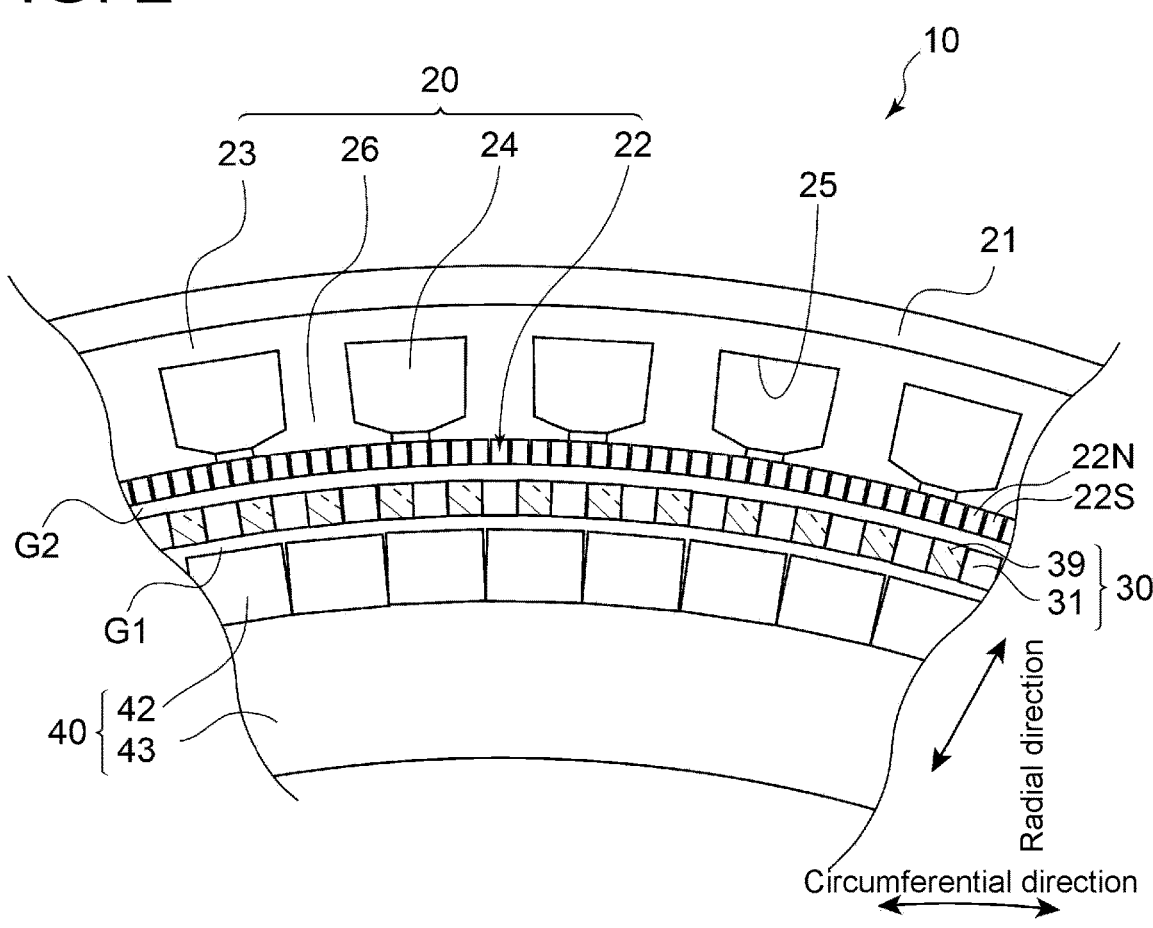
FIG. 2 is a radial cross-sectional view of the magnetic geared rotating machine according to an embodiment.

FIG. 2 is a radial cross-sectional view of the magnetic geared rotating machine according to an embodiment. In FIG. 2, only some components of the magnetic geared rotating machine 10 are hatched for the sake of illustrative convenience. In FIG. 2, the "circumferential direction" is the circumferential direction based on the already-described "axial direction" (see FIG. 1A, 1B).

As illustrated in FIG. 2, the stator 20 of the magnetic geared rotating machine 10 includes a stator core 23 extending in the circumferential direction, the plurality of teeth 26 protruding from the stator core 23 toward the magnetic pole piece rotor 30, and the plurality of stator magnets 22 disposed on a tip side of the plurality of teeth 26. A plurality of slots 25 extending in the axial direction are disposed between two adjacent teeth 26 among the plurality of teeth 26 aligned in the circumferential direction. Axial both ends of each of the slots 25 are open, and the above-described stator winding 24 is wound around the slot 25. That is, the plurality of teeth 26 support the stator winding 24. A coil end of the stator winding 24 that does not fit into the slot 25 may protrude from the stator core 23.

Further, the plurality of stator magnets 22 include a plurality of stator magnets 22N, 22S alternately aligned in the circumferential direction and having different magnetic poles.

In the example shown in FIG. 2, each of the stator magnets 22 is an axially elongated rod-shaped member having a rectangular cross section.

FIG. 2 shows the stator 20 having a surface permanent magnet (SPM) structure in which the stator magnets 22 are attached to the surface of the tooth 26. In another embodiment, the stator 20 may have an interior permanent magnet (IPM) structure in which the stator magnets 22 are embedded in the stator core 23.

The rotor 40 which is disposed at a position radially displaced from the stator 20 of the above-described configuration includes the plurality of rotor magnets 42 arranged so as to be aligned in the circumferential direction. The plurality of rotor magnets 42 are a plurality of permanent magnets alternately arranged in the circumferential direction and having different magnetic poles. The number of magnetic poles of the plurality of rotor magnets 42 is less than the number of magnetic poles of the plurality of stator magnets 22. Each of the rotor magnets 42 may be an elongated rod member having a rectangular cross section.

FIG. 2 shows the rotor 40 having a surface permanent magnet (SPM) structure in which the rotor magnets 42 are attached to the surface of the rotor core 43. In another embodiment, the rotor 40 may have an interior permanent magnet (IPM) structure in which the rotor magnets 42 are embedded in the rotor core 43.

Besides the rotor magnet 42 and the rotor core 43, the rotor 40 may include the end plate 44 described above with reference to FIGS. 1A and 1B. The end plate 44 is an annular plate extending along the radial direction.

The magnetic pole piece rotor 30 includes the plurality of magnetic pole pieces 31 arranged so as to be aligned in the circumferential direction at a radial position between the stator 20 and the rotor 40 configured as described above. Each of the magnetic pole pieces 31 includes the already-described plurality of axially laminated electrical steel sheets 35 (see FIG. 1A, 1B). Each of the magnetic pole pieces 31 opposes the rotor 40 with a first air gap G1 therebetween and opposes the stator 20 with a second air gap G2 therebetween. For example, in an embodiment in which both the rotor 40 and the stator 20 have a surface permanent magnet structure, the magnetic pole piece rotor 30 opposes the rotor magnet 42 with the first air gap G1 therebetween, and the magnetic pole piece rotor 30 opposes the stator magnet 22 with the second air gap G2 therebetween. In another embodiment, the magnetic pole piece rotor 30 may oppose each of the stator core 23 and the rotor core 43.

Further, the magnetic pole piece rotor 30 includes a plurality of holders 39 arranged in the circumferential direction alternately with the plurality of magnetic pole pieces 31. Each of the holders 39 according to an embodiment is formed by a non-magnetic material. In another embodiment, the holder 39 may be formed by a magnetic material. Each of the magnetic pole pieces 31 is sandwiched and held by two holders 39 disposed on circumferential both sides.

Further, a hole 38 (see FIG. 3) which may be, for example, circular when viewed in the axial direction may be formed in the center of each of the plurality of electrical steel sheets 35 forming the magnetic pole piece 31. The plurality of electrical steel sheets 35 may be held by inserting bars (not shown) extending in the axial direction into these holes 38. Axial both ends of the above-described bar may respectively be connected to the above-described pair of end plates 30A (see FIG. 1A).

Figure 3:
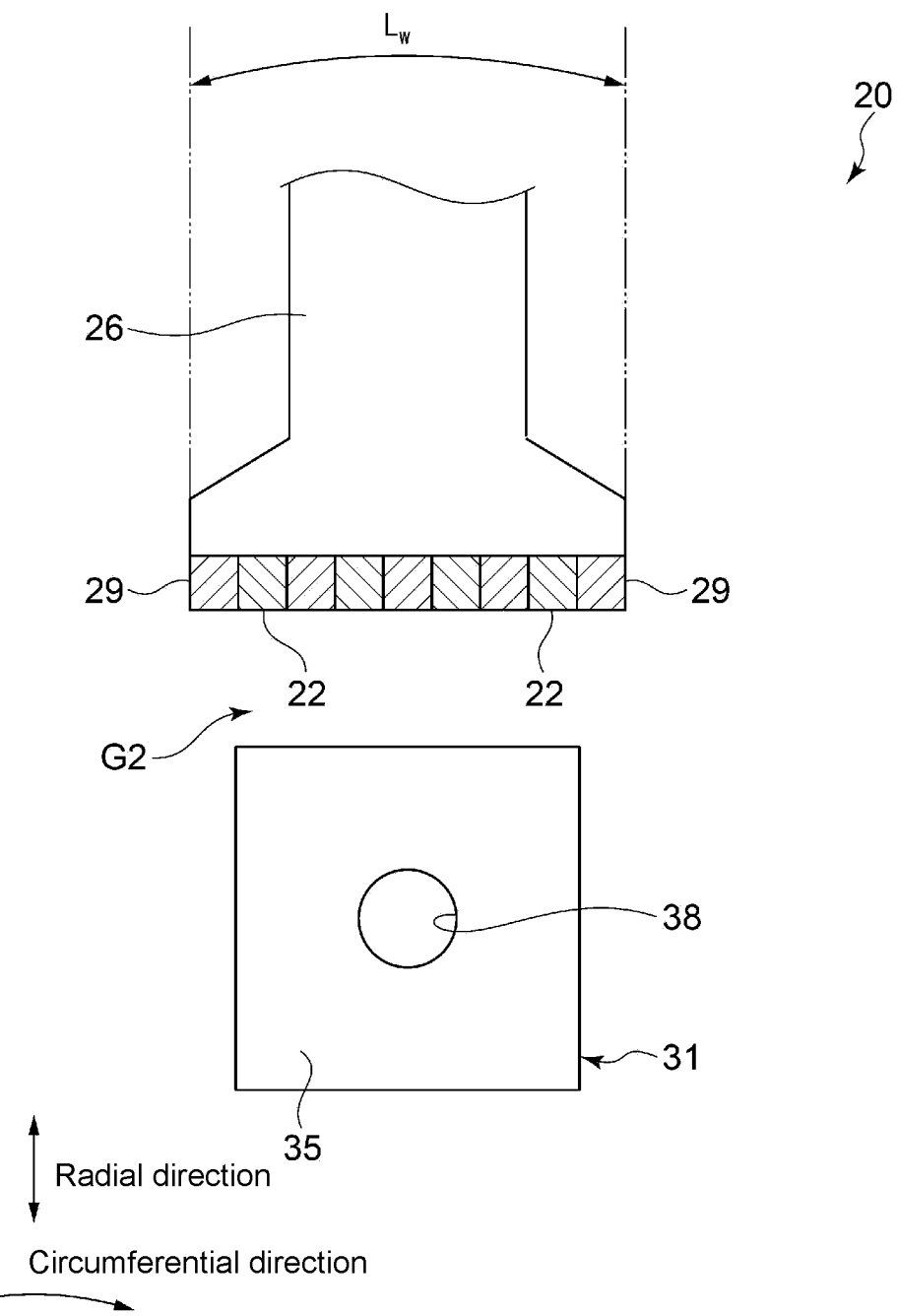
FIG. 3 is a schematic view of a stator according to an embodiment.

Next, a more detailed configuration of the stator 20 according to an embodiment will be exemplified with reference to FIG. 3. FIG. 3 is a schematic view of the stator according to an embodiment. The stator 20 may further include a plurality of fingers 29 for holding therebetween the stator magnets 22 disposed at a tip of the tooth 26 from both sides in the circumferential direction. Each finger 29 extending in the axial direction is disposed on a surface on the tip side of the tooth 26 so as to form an integral structure with the tooth 26. The fingers 29 may directly be connected to the tooth 26, or at least part of the fingers 29 may indirectly be connected to the tooth 26 via another member such as a holder.

In FIG. 3, a circumferential length at the tip of the tooth 26 (hereinafter, also referred to as a tip width of the tooth 26) is indicated by a dimension Lw.

Figure 4:
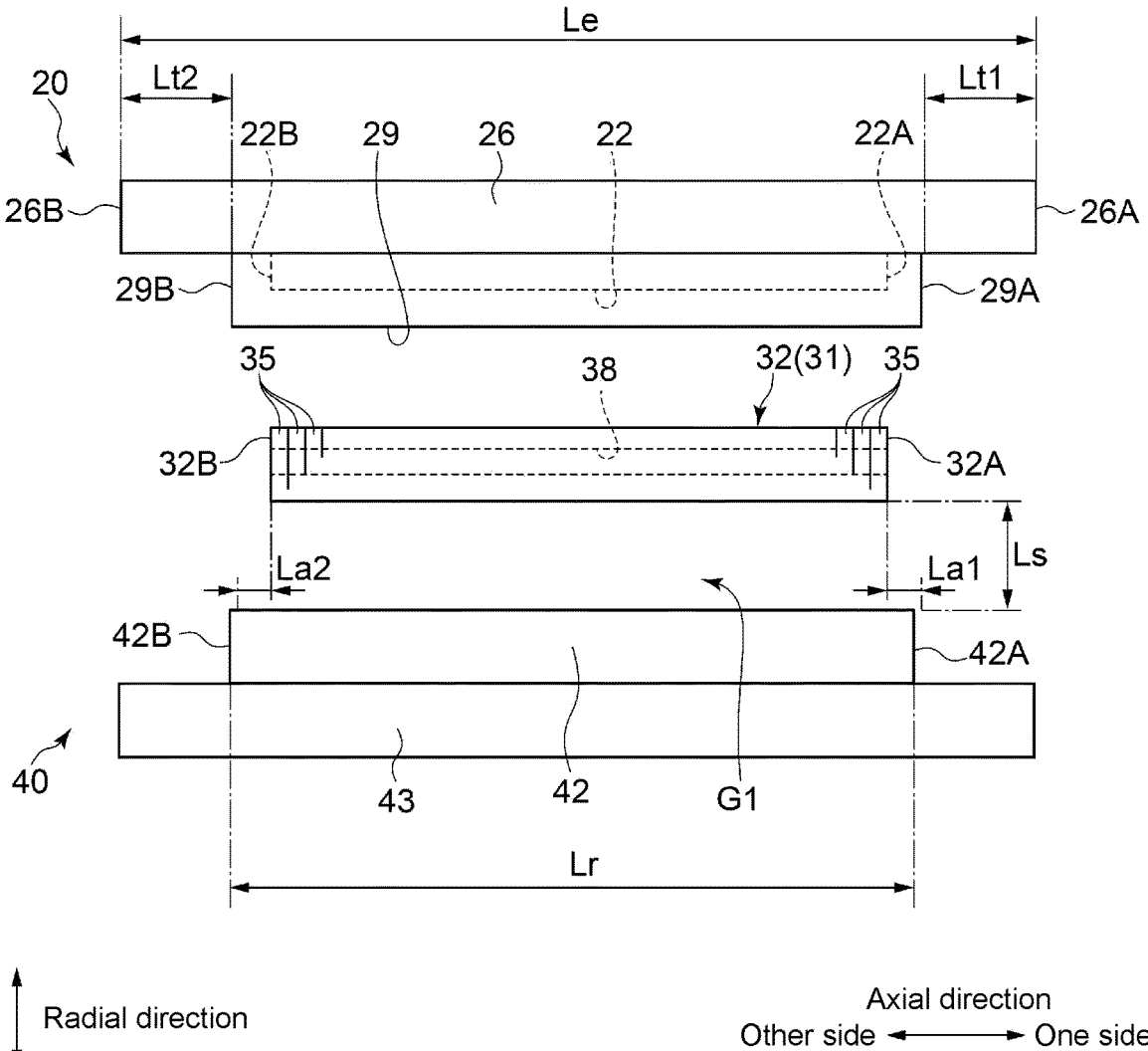
FIG. 4 is a schematic view showing the internal configuration of the magnetic geared rotating machine including a magnetic pole piece according to the first embodiment.

Further, the tooth 26 has a tooth end face 26A facing one side in the axial direction and a tooth opposite face 26B opposite to the tooth end face 26A (see FIG. 4).

(Positional Relationship Between Magnetic Pole Piece 32 and Rotor 40 According to First Embodiment)

Details of the internal structure of the magnetic geared rotating machine 10 will be described with reference to FIG. 4. FIG. 4 is a schematic view showing the internal configuration of the magnetic geared rotating machine including the magnetic pole piece according to the first embodiment.

The magnetic pole piece 32 (31) according to the first embodiment has a magnetic pole piece end face 32A facing the one side in the axial direction, and the rotor magnet 42 has a rotor magnet end face 42A facing the one side in the axial direction. In the present embodiment, a relationship (hereinafter, also referred to as a first positional relationship) is established in which at least part of the magnetic pole piece end face 32A is located on the other side in the axial direction relative to the rotor magnet end face 42A.

Further, a similar positional relationship is also established on the other side in the axial direction. Specifically, the magnetic pole piece 32 has a magnetic pole piece opposite face 32B opposite to the magnetic pole piece end face 32A, and the rotor magnet 42 has a rotor magnet opposite face 42B opposite to the rotor magnet end face 42A. Then, a relationship (hereinafter, also referred to as a second positional relationship) is established in which at least part of the magnetic pole piece opposite face 32B is located on the one side in the axial direction relative to the rotor magnet opposite face 42B.

Therefore, in the embodiment illustrated in FIG. 4, the magnetic pole piece 32 is disposed at an axial position between the axial both ends of the rotor magnet 42. That is, the magnetic pole piece 32 in the present example is shorter than the rotor magnet 42 in the axial direction.

Further, in the embodiment illustrated in FIG. 4, the plurality of electrical steel sheets 35 forming the magnetic pole piece 32 have the same size. Therefore, only one side of the single electrical steel sheet 35 located on the farthest one side forms the magnetic pole piece end face 32A, and only one side of the single electrical steel sheet 35 located on the farthest another side forms the magnetic pole piece opposite face 32B.

The magnetic pole piece end face 32A and the magnetic pole piece opposite face 32B may each be constituted by one side of the plurality of electrical steel sheets 35 (details will be described later with reference to FIG. 5).

According to the findings of the present inventors, an eddy current in an axial one end portion of the magnetic pole piece 32 is reduced by the establishment of the first positional relationship. Likewise, an eddy current in an axial other end portion of the magnetic pole piece 32 is reduced by the establishment of the second positional relationship. Therefore, according to the above configuration, it is possible to implement the magnetic geared rotating machine 10 in which the eddy current loss is reduced. At least either of the first positional relationship or the second positional relationship can be established even when a third positional relationship described later is not established.

In another embodiment, the second positional relationship may not be established. That is, the magnetic pole piece opposite face 32B may be located at the same axial position as the rotor magnet opposite face 42B, or may be located on the other side in the axial direction relative to the rotor magnet opposite face 42B. Even in this case, the effect of reducing the eddy current loss in the magnetic geared rotating machine 10 can be achieved by the establishment of the first positional relationship.

An axial distance (dimension La1) from the magnetic pole piece end face 32A to the rotor magnet end face 42A will be described in detail. In the present embodiment, the dimension La1 is at least 0.5% of the axial length (dimension Lr) of the rotor magnet 42 and at most 10% of the axial length of the rotor magnet 42.

A similar relationship is also established on the other side in the axial direction. Specifically, an axial distance (dimension La2) from the magnetic pole piece opposite face 32B to the rotor magnet opposite face 42B is at least 0.5% of the axial length of the rotor magnet 42 and at most 10% of the axial length of the rotor magnet 42.

Since FIG. 4 is the schematic view, the above-described length relationship and positional relationship of the components included in the magnetic geared rotating machine 10 are not necessarily shown faithfully. This also applies to a length relationship and positional relationship described separately later, and also applies to FIG. 5.

According to the findings of the present inventors, since the axial distance from the magnetic pole piece end face 32A to the rotor magnet end face 42A is at least 0.5% of the axial length of the rotor magnet 42 and at most 10% of the axial length of the rotor magnet 42, the eddy current loss in the axial one end portion of the magnetic pole piece 32 is significantly reduced. Likewise, since the axial distance from the magnetic pole piece opposite face 32B to the rotor magnet opposite face 42B is at least 0.5% of the axial length of the rotor magnet 42 and at most 10% of the axial length of the rotor magnet 42, the eddy current loss in the axial other end portion of the magnetic pole piece 32 is significantly reduced. Therefore, according to the above configuration, the magnetic geared rotating machine 10 is implemented in which the eddy current loss is more effectively reduced.

The axial distance (dimension La2) from the magnetic pole piece opposite face 32B to the rotor magnet opposite face 42B may be less than 0.5% of the axial length (dimension Lr) of the rotor magnet 42, or may exceed 10% of the dimension Lr. Even in this case, since the dimension La1 and the dimension Lr have the above-described relationship, it is possible to achieve the effect of reducing the eddy current loss in the magnetic pole piece 32.

Further, in the present embodiment, the axial distance (dimension La1) from the magnetic pole piece end face 32A to the rotor magnet end face 42A is at least 50% of an opposing distance (dimension Ls) between the magnetic pole piece 32 and the rotor 40, and at most 1200% of the opposing distance.

The same applies to the other side in the axial direction. Specifically, the axial distance (dimension La2) from the magnetic pole piece opposite face 32B to the rotor magnet opposite face 42B is at least 50% and at most 1200% of the dimension Ls.

In the example of FIG. 4 in which the rotor 40 has a surface magnet type structure, the dimension Ls is a radial distance between the magnetic pole piece 32 and the rotor magnet 42. In another example, the dimension Ls may be a radial distance between the magnetic pole piece 32 and the rotor core 43. Further, the dimension Ls may coincide with a radial dimension of the above-described first air gap G1.

According to the findings of the present inventors, since the axial distance (dimension La1) from the magnetic pole piece end face 32A to the rotor magnet end face 42A is at least 50% and at most 1200% of the opposing distance (dimension Ls) between the magnetic pole piece 32 and the rotor 40, the eddy current loss in the axial one end portion of the magnetic pole piece 32 is significantly reduced. Likewise, since the axial distance (dimension La2) from the magnetic pole piece opposite face 32B to the rotor magnet opposite face 42B is at least 50% and at most 1200% of the opposing distance (dimension Ls) between the magnetic pole piece 32 and the rotor 40, the eddy current loss in the axial other end portion of the magnetic pole piece 32 is significantly reduced. Therefore, according to the above configuration, the magnetic geared rotating machine 10 is implemented in which the eddy current loss is more effectively reduced.

The axial distance (dimension La2) from the magnetic pole piece opposite face 32B to the rotor magnet opposite face 42B may be less than 50% of the opposing distance (dimension Ls) between the magnetic pole piece 32 and the rotor 40, or may exceed 1200% of the dimension Ls. Even in this case, since the dimension La1 and the dimension Ls have the above-described relationship, it is possible to achieve the effect of reducing the eddy current loss in the magnetic pole piece 32.

(Positional Relationship Between Finger 29 and Tooth 26)

In the embodiment illustrated in FIG. 4, the finger 29 has a finger end face 29A facing the one side in the axial direction, and the tooth 26 has a tooth end face 26A facing the one side in the axial direction. In the present example, a relationship (hereinafter, also referred to as the third positional relationship) is established in which the finger end face 29A is located on the other side in the axial direction relative to the tooth end face 26A.

Further, a similar positional relationship is also established on the other side in the axial direction. Specifically, the finger 29 has a finger opposite face 29B opposite to the finger end face 29A, and the tooth 26 has a tooth opposite face 26B opposite to the tooth end face 26A. Then, a relationship (hereinafter, also referred to as a fourth positional relationship) is established in which the finger opposite face 29B is located on the other side in the axial direction relative to the tooth opposite face 26B.

According to the findings of the present inventors, an eddy current loss in the axial one end portion of the stator 20 is reduced by the establishment of the third positional relationship. Likewise, an eddy current loss in an axial other end portion of the stator 20 is reduced by the establishment of the fourth positional relationship. Therefore, according to the above configuration, it is possible to implement the magnetic geared rotating machine 10 in which the eddy current loss is reduced. At least either of the third positional relationship or the fourth positional relationship may be established together with the above-described first positional relationship, or can be established even when the first positional relationship is not established.

In another embodiment, the fourth positional relationship may not be established. That is, the finger opposite face 29B may be located at the same axial position as the tooth opposite face 26B, or may be located on the other side in the axial direction relative to the tooth opposite face 26B. Even in this case, the effect of reducing the eddy current loss in the magnetic geared rotating machine 10 can be achieved by the establishment of the third positional relationship.

An axial distance (dimension Lt1) from the finger end face 29A to the tooth end face 26A will be described in detail. In the present embodiment, the dimension Lt1 is at least 0.5% of an axial length (dimension Le) of the tooth 26 and at most 4% of the axial length of the tooth 26.

A similar relationship is also established on the other side in the axial direction. Specifically, an axial distance (dimension Lt2) from the finger opposite face 29B to the tooth opposite face 26B is at least 0.5% and at most 4% of the axial length of the tooth 26.

According to the findings of the present inventors, since the axial distance from the finger end face 29A to the tooth end face 26A is at least 0.5% and at most 4% of the axial length of the tooth 26, the eddy current loss in the axial one end portion of the stator 20 is significantly reduced. Likewise, since the axial distance from the finger opposite face 29B to the tooth opposite face 26B is at least 0.5% and at most 4% of the axial length of the tooth 26, the eddy current loss in the axial other end portion of the stator 20 is significantly reduced. Therefore, according to the above configuration, the magnetic geared rotating machine 10 is implemented in which the eddy current loss is more effectively reduced.

The axial distance (dimension Lt2) from the finger opposite face 29B to the tooth opposite face 26B may be less than 0.5% of the axial length (dimension Le) of the tooth 26, or may exceed 4% of the dimension Le. Even in this case, since the dimension Lt1 and the dimension Le have the above-described relationship, it is possible to achieve the effect of reducing the eddy current loss in the stator 20.

Further, in the embodiment illustrated in FIG. 4, the axial distance (dimension Lt1) from the finger end face 29A to the tooth end face 26A is at least 3% of the tip width (the dimension Lw in FIG. 3) of the tooth 26 and at most 25% of the tip width of the tooth 26. Further, the axial distance (dimension Lt2) from the finger opposite face 29B to the tooth opposite face 26B is also at least 3% and at most 25% of the tip width of the tooth 26.

According to the findings of the present inventors, since the axial distance from the finger end face 29A to the tooth end face 26A is at least 3% of the tip width of the tooth 26 and at most 25% of the tip width of the tooth 26, the eddy current loss in the axial one end portion of the stator 20 is significantly reduced. Likewise, since the axial distance from the finger opposite face 29B to the tooth opposite face 26B is at least 3% of the tip width of the tooth 26 and at most 25% of the tip width of the tooth 26, the eddy current loss in the axial other end portion of the stator 20 is significantly reduced. Therefore, according to the above configuration, the magnetic geared rotating machine 10 is implemented in which the eddy current loss is more effectively reduced.

In another embodiment, the axial distance (dimension Lt2) from the finger opposite face 29B to the tooth opposite face 26B may be less than 3% of the tip width (the dimension Lw in FIG. 3) of the tooth 26, or may exceed 25% of the dimension Lw. Even in this case, since the dimension Lt1 and the dimension Lw have the above-described relationship, it is possible to achieve the effect of reducing the eddy current loss in the stator 20.

(Positional Relationship Between Stator Magnet 22, Rotor Magnet 42, and Magnetic Pole Piece 32)

In the embodiment illustrated in FIG. 4, the stator magnet 22 has a stator magnet end face 22A facing the one side in the axial direction and a stator magnet opposite face 22B opposite to the stator magnet end face 22A. The stator magnet end face 22A is located on the other side in the axial direction relative to the rotor magnet end face 42A. Further, the rotor magnet opposite face 22B is located on the one side in the axial direction relative to the rotor magnet opposite face 42B. Therefore, the stator magnet 22 is shorter than the rotor magnet 42 in the axial direction.

FIG. 4 schematically illustrates the stator magnet 22 having a shorter radial length than the finger 29, for the sake of illustrative convenience. However, the stator magnet 22 may have the same radial length as the finger 29, or may be longer than the finger 29 in the radial direction.

According to the findings of the present inventors, since the stator magnet end face 22A is located on the other side in the axial direction relative to the rotor magnet end face 42A, it is possible to reduce the eddy current loss in the magnetic pole piece 32 on the one side in the axial direction. It is also possible to reduce the axial length of the stator magnet 22. Further, since the stator magnet opposite face 22B is located on the one side in the axial direction relative to the rotor magnet opposite face 42B, it is possible to reduce the eddy current loss in each of the magnetic pole piece 32 and the stator 20 on the other side in the axial direction, and it is possible to reduce the axial length of the stator 20. Therefore, according to the above configuration, it is possible to implement the magnetic geared rotating machine 10 that achieves both the reduction in eddy current loss and the reduction in cost.

The stator magnet opposite face 22B may be located at the same axial position as the rotor magnet opposite face 42B, or may be located on the other side in the axial direction relative to the rotor magnet opposite face 42B. Even in this case, since the stator magnet end face 22A is located on the other side in the axial direction relative to the rotor magnet end face 42A, it is possible to achieve the reduction in eddy current loss and the reduction in cost of the magnetic geared rotating machine 10.

In the embodiment illustrated in FIG. 4, the stator magnet end face 22A is disposed at the same axial position as the magnetic pole piece end face 32A or at the axial position between the magnetic pole piece end face 32A and the rotor magnet end face 42A. Likewise, also on the other side in the axial direction, the stator magnet opposite face 22B is disposed at the same axial position as the magnetic pole piece opposite face 32B or at the axial position between the magnetic pole piece opposite face 32B and the rotor magnet opposite face 42B.

According to the findings of the present inventors, the portion of the stator magnet 22 located on the one side relative to the magnetic pole piece end face 32A hardly contributes to generation of magnetic transmission torque in the magnetic geared rotating machine 10. Therefore, according to the above configuration, it is possible to reduce the unnecessary stator magnets 22 and it is possible to reduce the cost of the magnetic geared rotating machine 10.

The stator magnet opposite face 22B may be located on the other side in the axial direction relative to the magnetic pole piece opposite face 32B. Even in this case, if the positional relationship between the stator magnet end face 22A and the magnetic pole piece end face 32A is as described above, it is possible to reduce the cost of the magnetic geared rotating machine 10.

(Positional Relationship Between Magnetic Pole Piece 33 and Rotor 40 According to Second Embodiment)

Figure 5:
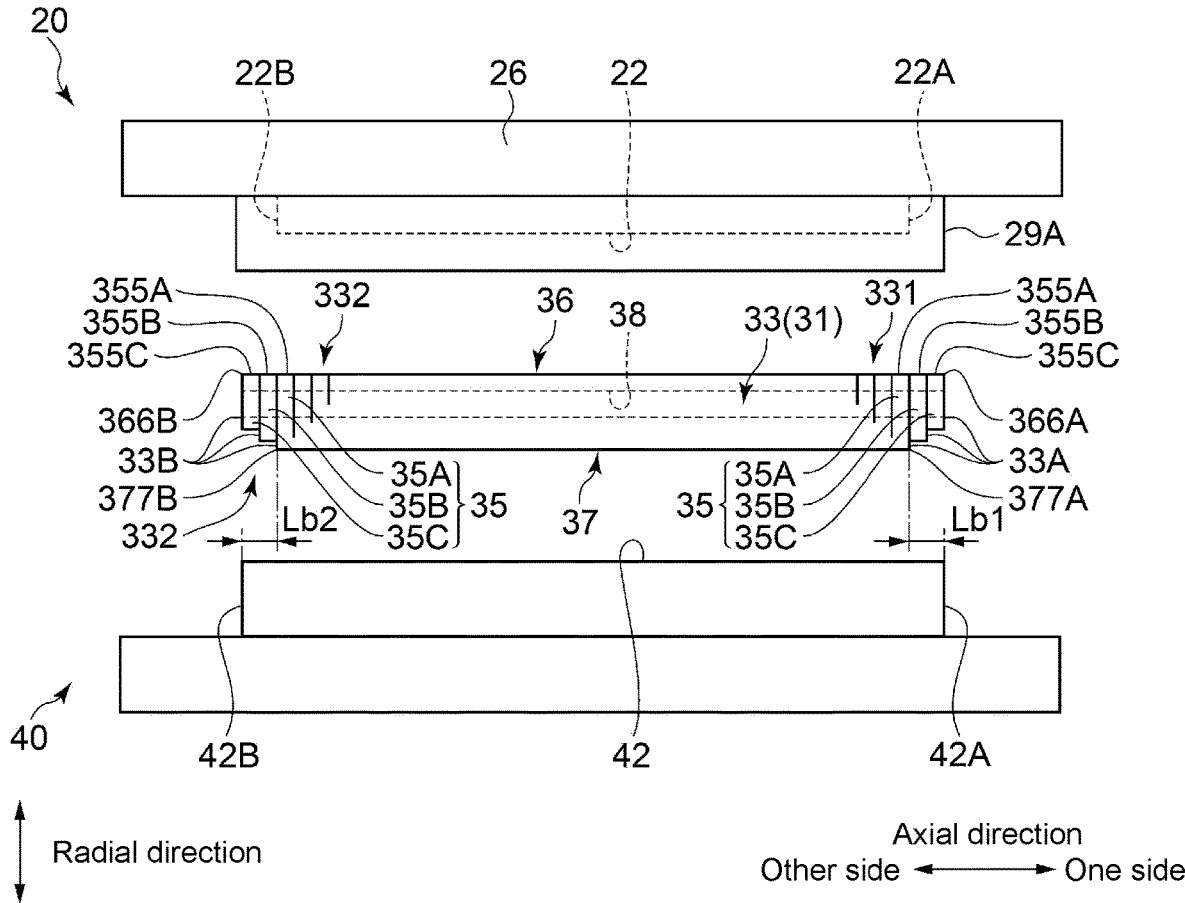
FIG. 5 is a schematic view showing the internal configuration of the magnetic geared rotating machine including a magnetic pole piece according to the second embodiment.

FIG. 5 is a schematic view showing the internal configuration of the magnetic geared rotating machine including the magnetic pole piece according to the second embodiment.

The magnetic pole piece 33 (31) according to the second embodiment has a first magnetic pole piece end portion 331 which is an end portion on the one side in the axial direction, and a second magnetic pole piece end portion 332 opposite to the first magnetic pole piece end portion 331. The first magnetic pole piece end portion 331 is formed with a magnetic pole piece end face 33A which is an end face of the magnetic pole piece 33 facing the one side in the axial direction, and the second magnetic pole piece end portion 332 is formed with a magnetic pole piece opposite face 33B which is an end face opposite to the magnetic pole piece end face 33A.

In each of the first magnetic pole piece end portion 331 and the second magnetic pole piece end portion 332, the plurality of electrical steel sheets 35 forming the magnetic pole piece 33 includes a first electrical steel sheet 35A, a second electrical steel sheet 35B, and a third electrical steel sheet 35C, which are disposed in order from an axial center side of the magnetic pole piece 33. Radial lengths of these electrical steel sheets 35 are shorter as the electrical steel sheets 35 are located on the outer side in the axial direction. Further, radial positions of respective end portions 355A, 355B, and 355C of the first electrical steel sheet 35A, the second electrical steel sheet 35B, and the third electrical steel sheet 35C on the stator 20 side are aligned. That is, these electrical steel sheets 35 are laminated such that the radial positions of the end portions on the stator 20 side are aligned.

In the above-described first magnetic pole piece end portion 331, one side of each of the first electrical steel sheet 35A, the second electrical steel sheet 35B, and the third electrical steel sheet 35C forms the magnetic pole piece end face 33A. Likewise, in the second magnetic pole piece end portion 332, one side of each of the first electrical steel sheet 35A, the second electrical steel sheet 35B, and the third electrical steel sheet 35C forms the magnetic pole piece opposite face 33B.

Among the holes 38 (see FIG. 3) formed in the electrical steel sheets 35, the hole 38 formed in the first electrical steel sheet 35A has a circular shape when viewed in the axial direction. On the other hand, the hole 38 formed in each of the second electrical steel sheet 35B and the third electrical steel sheet 35C has a semicircular shape. For example, the hole 38 formed in the third electrical steel sheet 35C preferably surrounds not less than half of a peripheral surface of the bar (not shown) when viewed in the axial direction. Whereby, a configuration is implemented in which the third electrical steel sheet 35C is unlikely to deviate radially outward from the bar.

In the first magnetic pole piece end portion 331, the magnetic pole piece end face 33A formed by the one side of the third electrical steel sheet 35C is located at the same axial position as the rotor magnet end face 42A, but the above-described first positional relationship is established. This is because the magnetic pole piece end face 33A formed by the one side of each of the first electrical steel sheet 35A and the second electrical steel sheet 35B is located on the other side in the axial direction relative to the rotor magnet end face 42A.

Likewise, also in the second magnetic pole piece end portion 332, since the one side of each of the first electrical steel sheet 35A and the second electrical steel sheet 35B forming the magnetic pole piece opposite face 33B is located on the one side in the axial direction relative to the rotor magnet opposite face 42B, the second positional relationship is established.

According to the findings of the present inventors, the eddy current loss in the axial one end portion of the magnetic pole piece 33 is reduced even if the first positional relationship is established in which only part of the magnetic pole piece end face 33A is located on the other side in the axial direction relative to the rotor magnet end face 42A. Likewise, the eddy current loss in the axial other end portion of the magnetic pole piece 33 is reduced even if the second positional relationship is established in which only part of the magnetic pole piece opposite face 33B is located on the one side in the axial direction relative to the rotor magnet opposite face 42B. Therefore, it is possible to reduce the eddy current loss in the magnetic geared rotating machine 10.

In the embodiment illustrated in FIG. 5, the axial distance between the magnetic pole piece end face 33A and the rotor magnet end face 42A is the axial distance between the rotor magnet end face 42A and the end portion of the magnetic pole piece end face 33A on the rotor 40 side (that is, the magnetic pole piece end face 33A formed by the first electrical steel sheet 35A), and corresponds to the dimension Lb1 in FIG. 5. For example, if the dimension Lb1 is at least 0.5% of the axial length of the rotor magnet 42 and at most 10% of the axial length of the rotor magnet 42, it is possible to achieve the remarkable effect of reducing the eddy current loss in the magnetic pole piece 33 on the one side in the axial direction. Further, if the dimension Lb1 is at least 50% and at most 1200% of the opposing distance between the magnetic pole piece 33 and the rotor 40 (the rotor magnet 42 in FIG. 5), it is possible to achieve the remarkable effect of reducing the eddy current loss in the magnetic pole piece 33 on the one side in the axial direction.

In the embodiment illustrated in FIG. 5, the magnetic pole piece 33 has a stator side opposing face 36 opposing the stator 20 (the stator magnet 22 in the example of FIG. 5), and a rotor side opposing face 37 opposing the rotor 40 (the rotor magnet 42 in the example of FIG. 5). Both the stator side opposing face 36 and the rotor side opposing face 37 extend in the axial direction.

In the example of FIG. 5, the respective end portions 355A, 355B, and 355C of the first electrical steel sheet 35A, the second electrical steel sheet 35B, and the third electrical steel sheet 35C form part of the stator side opposing face 36. On the other hand, only the end portion of the first electrical steel sheet 35A among these electrical steel sheets 35 on the rotor 40 side forms part of the rotor side opposing face 37, and the second electrical steel sheet 35B and the third electrical steel sheet 35C are disposed at radial positions between the stator 20 and the rotor side opposing face 37.

Therefore, the stator side opposing face 36 is longer than the rotor side opposing face 37 in the axial direction.

The longer the axial length of the stator side opposing face 36 is, the greater the magnetic transmission torque (more specifically, magnetic torque transmitted between the magnetic pole piece rotor 30 and the rotor 40) during operation of the magnetic geared rotating machine 10 tends to be. According to the above configuration, since the stator side opposing face 36 is longer than the rotor side opposing face 37, the axial length of the stator side opposing face 36 can be ensured while at least the part of the magnetic pole piece end face 32A is located on the other side in the axial direction relative to the rotor magnet end face 42A. Therefore, the magnetic geared rotating machine 10 is implemented which is capable of reducing the eddy current loss as well as ensuring the magnetic transmission torque.

Further, the configuration where the stator side opposing face 36 is longer than the rotor side opposing face 37 in the axial direction can be implemented by the simple configuration where the first electrical steel sheet 35A, the second electrical steel sheet 35B, and the third electrical steel sheet 35C having the different radial lengths are laminated. Therefore, with the simple configuration where the plurality of electrical steel sheets 35 having the different radial lengths are laminated, it is possible to achieve both the reduction in eddy current loss and ensuring of the magnetic transmission torque in the magnetic geared rotating machine 10.

Further, in the embodiment of FIG. 5, the stator magnet end face 22A is disposed at the same axial position as an end 366A of the stator side opposing face 36 on the one side in the axial direction or at an axial position between the end 366A of the stator side opposing face 36 and an end 377A of the rotor side opposing face 37 on the one side. Further, the stator magnet opposite face 22B is disposed at the same position as an end 366B of the stator side opposing face 36 on the other side in the axial direction, or an axial position between the end 366B of the stator side opposing face 36 and end 377B of the rotor side opposing face 37 on the other side.

As described above, the portion of the stator magnet 22 located axially outward of the magnetic pole piece 33 hardly contributes to the generation of the magnetic transmission torque of the magnetic geared rotating machine 10. According to the above configuration, since it is possible to reduce the portion of the stator magnet 22 that hardly contributes to the magnetic transmission torque, it is possible to reduce the cost of the magnetic geared rotating machine 10.

The stator magnet opposite face 22B may be located on the other side in the axial direction relative to the end 366B of the stator side opposing face 36. Even in this case, for example, if the stator magnet end face 22A is located at the same axial position as the end 366A of the stator side opposing face 36, it is possible to reduce the cost of the magnetic geared rotating machine 10.

Example 1

Figure 6:
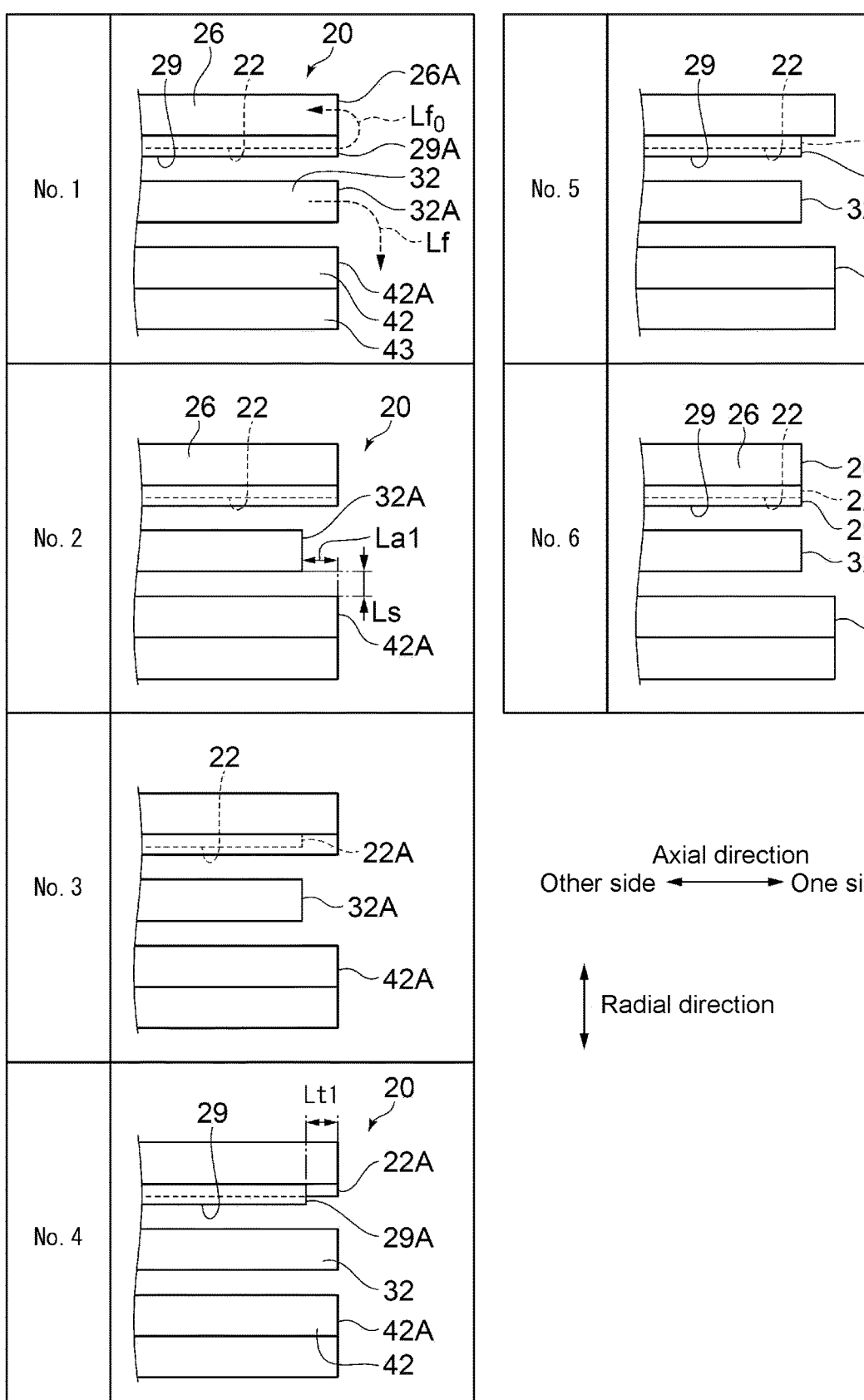
FIG. 6 is a view showing various magnetic geared rotating machines prepared for verifying the effect of reducing an eddy current loss.
Figure 7:
FIG. 7 shows a graph and a table of eddy current losses when axial positions of components of the magnetic geared rotating machine are changed.

The relationship between the axial positional relationship between the components of the magnetic geared rotating machine 10 and the effect of reducing the eddy current loss will be described with reference to FIG. 6, 7. FIG. 6 shows various magnetic geared rotating machines prepared for verifying the effect of reducing the eddy current loss. FIG. 7 shows the eddy current losses when the axial positions of the components of the magnetic geared rotating machine are changed.

The present inventors identified, by simulation, the effect of reducing the eddy current loss by changing the axial positions of the components of the magnetic geared rotating machine 10 including the magnetic pole piece 32 according to the first embodiment. More specifically, the axial positions of the components indicated by the following (A) to (D) were changed, and the eddy current losses obtained by analysis were compared.

(A) Magnetic pole piece end face 32A
    (B) Stator magnet end face 22A
    (C) Finger end face 29A
    (D) Tooth end face 26A More detailed analysis conditions will be described. With the magnetic geared rotating machine 10 where the axial positions of (A) to (D) described above are aligned as a reference (No. 1), the magnetic geared rotating machine 10 where any of the components was displaced to the other side in the axial direction (the axial length of the component is shortened) was assumed to be No. 2 to No. 6. For example, as shown in FIG. 6, 7, in the magnetic geared rotating machine 10 of No. 2, the magnetic pole piece end face 32A is displaced to the other side in the axial direction relative to the reference. Further, in the magnetic geared rotating machine 10 of No. 3, the magnetic pole piece end face 32A and the stator magnet end face 22A are displaced to the other side in the axial direction relative to the reference. The graph on the upper stage of FIG. 7 shows results of identifying, by simulation, the eddy current losses when each of the magnetic geared rotating machines 10 of No. 1 to No. 6 functions as the magnetic geared generator 10A. The eddy current losses shown in the graph are each the sum of the eddy current loss in the magnetic pole piece 32 on the one side in the axial direction and the eddy current loss in the stator 20 on the one side in the axial direction.

"PP" in the table at a lower stage of FIG. 7 is an abbreviation for "Pole Piece" and indicates the magnetic pole end face 32A. "HSR Mag" is an abbreviation for "High Speed Rotor Magnet" and indicates the rotor magnet end face 42A (the axial position of the rotor magnet end face 42A has not been changed in this analysis). "ST Mag" is an abbreviation for "Stator Magnet" and indicates the stator magnet end face 22A. "ST Finger" is an abbreviation for "Stator Finger" and indicates the finger end face 29A. "ST Teeth" is an abbreviation for "Stator Teeth" and indicates the tooth end face 26A.

The amounts by which the components indicated by No. 2 to No. 6 are displaced to the other side in the axial direction relative to the reference are all the same value (constant value).

By comparing No. 1 with No. 2 in FIG. 7, it is understood that the eddy current loss (especially the eddy current loss in the magnetic pole piece 32) is reduced if the magnetic pole piece end face 32A is located on the other side in the axial direction relative to the rotor magnet end face 42A. That is, it is understood that the eddy current loss in the magnetic geared rotating machine 10 is reduced if the first positional relationship is established. Regardless of whether the components of (B) to (D) described above are displaced to the other side in the axial direction, it is understood, by comparing No. 1 with No. 3, No. 5, and No. 6, that the eddy current loss (especially the eddy current in the magnetic pole piece 32) is reduced if the first positional relationship is established.

According to the findings of the present inventors, the reason why the eddy current loss in the magnetic pole piece 32 is reduced is as follows. The leakage magnetic flux Lf generated in the magnetic pole piece 32 passes through the magnetic pole piece 32 in the axial direction and flows to the one side in the axial direction relative to the rotor magnet end face 42A (No. 1 in FIG. 6). In this respect, since the magnetic pole piece end face 32A is located on the other side in the axial direction relative to the rotor magnet end face 42A, it becomes difficult for the magnetic flux to flow from the magnetic pole piece end face 32A to the one side in the axial direction relative to the rotor magnet end face 42A. As a result, the leakage magnetic flux Lf generated in the magnetic pole piece 32 is suppressed and the eddy current loss in the magnetic pole piece 32 is reduced.

According to the above reasons, it can be concluded that the eddy current loss in the axial other end portion of the magnetic pole piece 32 is also reduced if the second positional relationship is established. Further, it can be concluded that the effect of reducing the eddy current loss can be achieved by the establishment of the first positional relationship, even if a configuration is adopted in which the stator side opposing face 36 of the magnetic pole piece 32 is longer than the rotor side opposing face 37. Furthermore, it can be concluded that a similar eddy current loss effect can be achieved also when the magnetic geared rotating machine 10 functions as the magnetic geared motor 10B.

Further, it is understood, by comparing No. 1 with No. 4 in FIG. 7, that the eddy current loss (especially the eddy current loss in the stator 20) is reduced if the finger end face 29A is located on the other side in the axial direction relative to the tooth end face 26A. That is, it is understood that the eddy current loss in the magnetic geared rotating machine 10 is reduced if the third positional relationship is established. Then, it is understood, by comparing No. 1 with No. 5, that the eddy current loss (especially the eddy current loss in the magnetic pole piece 32) is reduced if the third positional relationship is established, even if the components of (A) and (C) described above are displaced to the other side in the axial direction.

According to the findings of the present inventors, the reason why the eddy current loss in the teeth 26 is reduced is as follows. One cause of the eddy current loss in the stator 20 is that the magnetic flux flowing between the fingers 29 and along the axial direction flows into the teeth 26 from the one side in the axial direction (No. 1 in FIG. 6). The above-described magnetic flux flowing between the fingers 29 includes at least any of the magnetic flux $Lf_0$ (No. 1 in FIG. 6) caused by the stator magnet 22, the magnetic flux caused by the rotor magnet 42, or the magnetic flux caused by energization of the stator winding 24. In this respect, since the finger end face 29A is located on the other side in the axial direction relative to the tooth end face 26A, the above-described magnetic flux flowing between the fingers 29 can flow in various directions on the one side in the axial direction relative to the tooth end face 26A. As a result, the magnetic flux flowing into the tooth end face 26A from the one side in the axial direction is suppressed, reducing the eddy current flowing through the tooth 26. Whereby, at least the eddy current loss in the teeth 26 among the eddy current losses in the stator 20 is reduced.

According to the above reasons, it can be concluded that the effect of reducing the eddy current loss can be achieved even if the finger opposite face 29B is located on the one side in the axial direction relative to the tooth opposite face 26B (even if the fourth positional relationship is established). Furthermore, it can be concluded that a similar eddy current loss effect can be achieved also when the magnetic geared rotating machine 10 functions as the magnetic geared motor 10B.

Further, it was found, by comparing No. 1 with No. 3, No. 5, and No. 6 in FIG. 7, that the eddy current loss in the magnetic pole piece 32 is reduced if the stator magnet end face 22A is located on the other side in the axial direction relative to the rotor magnet end face 42A. Furthermore, according to the above-described analysis results, it was found that the effect of reducing the eddy current loss is the highest in the magnetic geared rotating machine 10 indicated by No. 5 where the magnetic pole piece end face 32A, the finger end face 29A, and the stator magnet end face 22A are displaced to the other side in the axial direction relative to the rotor magnet end face 42A and the tooth end face 26A.

Moreover, it was found that the effect of reducing the eddy current loss is also high in the magnetic geared rotating machine 10 indicated by No. 6 where the magnetic pole piece end face 32A, the stator magnet end face 22A, the finger end face 29A, and the tooth end face 26A are displaced to the other side in the axial direction relative to the rotor magnet end face 42A.

Example 2

Figure 8:
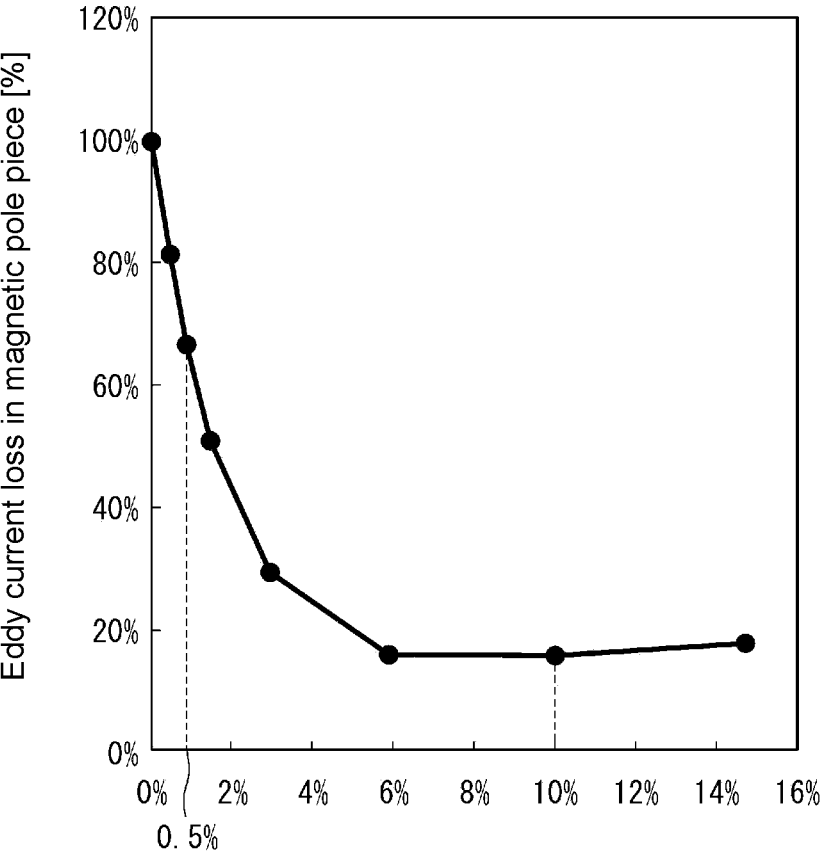
FIG. 8 is a first graph showing an eddy current loss depending on an axial distance between a magnetic pole piece end face and a rotor magnet end face.
Figure 9:
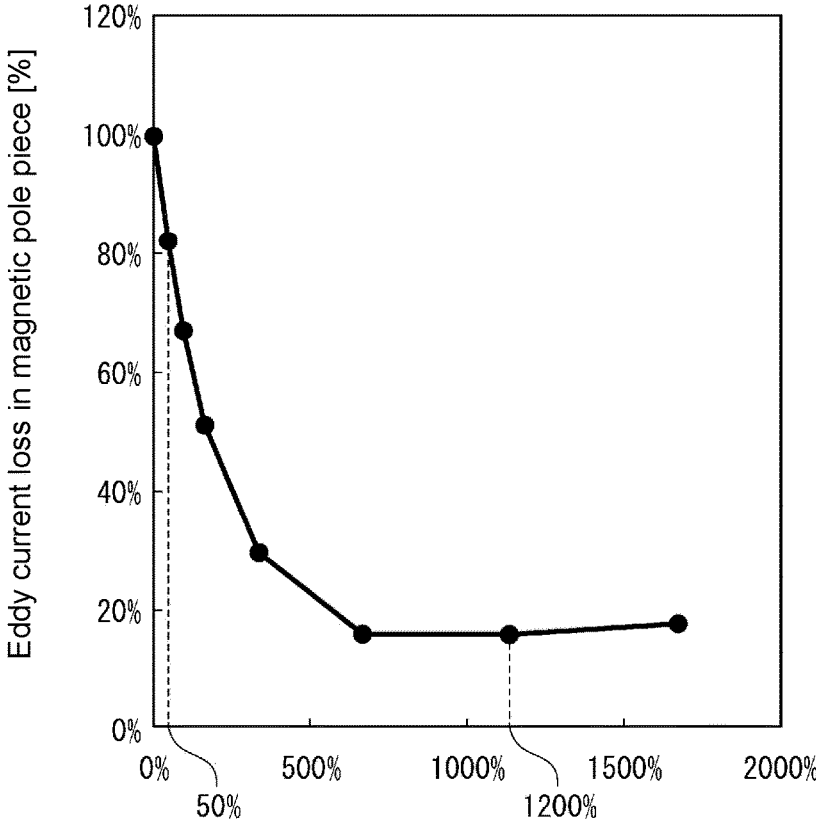
FIG. 9 is a second graph showing an eddy current loss depending on an axial distance between the magnetic pole piece end face and the rotor magnet end face.

The effect of reducing the eddy current loss in the magnetic pole piece 31 depending on the axial distance between the magnetic pole piece end face 32A and the rotor magnet end face 42A will be described with reference to FIG. 8, 9. FIG. 8 is a first graph showing the eddy current loss depending on the axial distance between the magnetic pole piece end face and the rotor magnet end face. FIG. 9 is a second graph showing the eddy current loss depending on the axial distance between the magnetic pole piece end face and the rotor magnet end face. The present inventors identified, by simulation, the relationship between the dimension La1 of the magnetic geared rotating machine 10 indicated by No. 2 in FIG. 6 and the eddy current loss in the magnetic pole piece 32 indicated by No. 2.

The horizontal axis of the graph in FIG. 8 indicates the percentage of the dimension La1 to the axial length (the dimension Lr in FIG. 4) of the rotor magnet 42. Further, the vertical axis of the graph indicates the percentage of the eddy current loss in the magnetic pole piece 32 indicated by No. 2 in FIG. 7 based on the eddy current loss in the magnetic pole piece 32 indicated by No. 1 (the same also applies to the vertical axis in FIG. 9). That is, it means that the smaller the value on the vertical axis, the higher the effect of reducing the eddy current loss in the magnetic pole piece 32. The horizontal axis of the graph in FIG. 9 indicates the percentage of the dimension La1 to the opposing distance (the dimension Ls in FIG. 6) between the magnetic pole piece 31 and the rotor 40. In this analysis, the axial length of the magnetic pole piece 32 is changed by the amount of the change in the dimension La1.

Moreover, plot points in the graphs of FIGS. 8 and 9 are the eddy current losses obtained by simulation (the same also applies to the graphs of FIGS. 10 and 11 described later).

As shown in the graph of FIG. 8, if the percentage of the dimension La1 to the axial length of the rotor magnet 42 becomes at least 0.5%, the eddy current loss becomes approximately at most 80%, and the remarkable effect of reducing the eddy current loss was confirmed. Further, it was found that the effect of reducing the eddy current loss does not improve even if the above-described percentage exceeds 10%. Therefore, it was found that the remarkable effect of reducing the eddy current loss is exhibited if the percentage of the dimension La1 to the axial length of the rotor magnet 42 is at least 0.5% and at most 10%.

Next, as shown in the graph of FIG. 9, if the percentage of the dimension La1 to the opposing distance between the magnetic pole pieces 31 and the rotor 40 is at least 50%, the eddy current loss becomes approximately at most 80%, and the remarkable effect of reducing the eddy current loss was confirmed. Further, it was found that the effect of reducing the eddy current loss does not improve even if the above-described percentage exceeds 1200%. Therefore, it was found that the remarkable effect of reducing the eddy current loss is exhibited if the percentage of the dimension La1 to the opposing distance between the magnetic pole pieces 31 and the rotor 40 is at least 50% and at most 1200%.

Example 3

The effect of reducing the eddy current loss in the tooth 26 depending on the axial distance from the finger end face 29A to the tooth end face 26A will be described with reference to FIG. 10, 11. FIG. 10 is a first graph showing the eddy current loss depending on the axial distance from the finger end face to the tooth end face. FIG. 11 is a second graph showing the eddy current loss depending on the axial distance from the finger end face to the tooth end face.

The present inventors identified, by simulation, the relationship between the dimension Lt1 of the magnetic geared rotating machine 10 indicated by No. 4 in FIG. 6 and the eddy current loss in the stator 20 indicated by No. 4.

Figure 10:
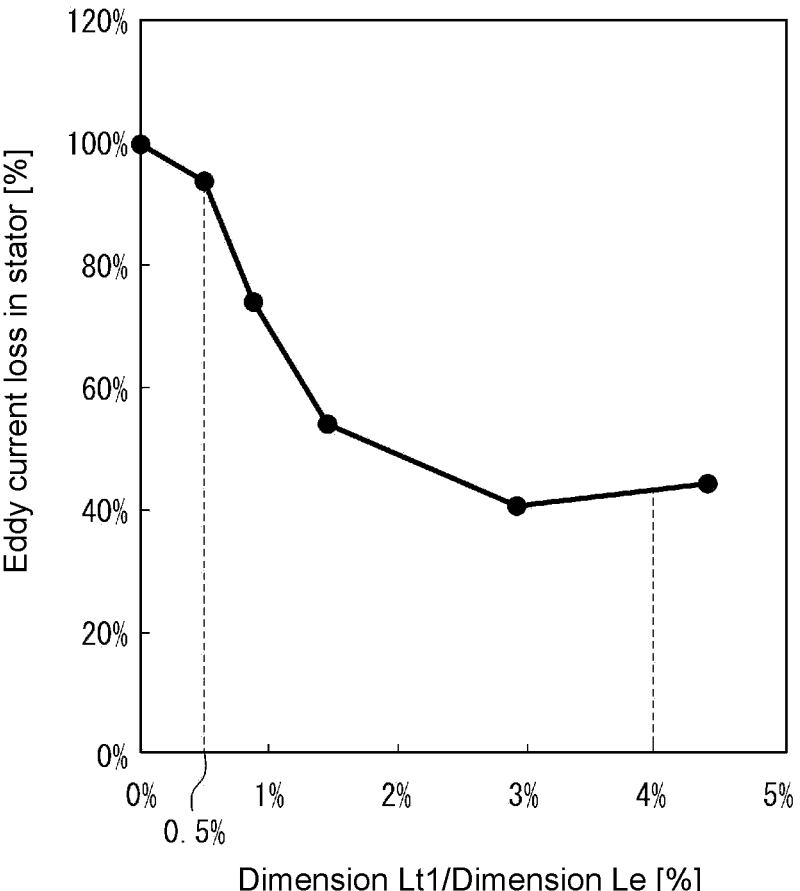
FIG. 10 is a first graph showing an eddy current loss depending on an axial distance from a finger end face to a tooth end face.

The horizontal axis of the graph in FIG. 10 indicates the percentage of the dimension Lt1 to the axial length (the dimension Le in FIG. 4) of the tooth 26. Further, the vertical axis of the graph indicates the percentage of the eddy current loss in the stator 20 indicated by No. 4 in FIG. 6 based on the eddy current loss in the stator 20 indicated by No. 1 (the same also applies to the vertical axis in FIG. 11). That is, it means that the smaller the value on the vertical axis, the higher the effect of reducing the eddy current loss in the stator 20. The horizontal axis of the graph in FIG. 11 indicates the percentage of the dimension Lw to the opposing distance (the dimension Ls in FIG. 6) between the magnetic pole piece 31 and the rotor 40. In this analysis, the axial length of the finger 29 is changed by the amount of the change in the dimension Lt.

As shown in the graph of FIG. 10, if the percentage of the dimension Lt1 to the axial length of the tooth 26 becomes at least 0.5%, the eddy current loss becomes at most 90%, and the remarkable effect of reducing the eddy current loss was confirmed. Further, it was found that the effect of reducing the eddy current loss does not improve even if the above-described percentage exceeds 4%. Therefore, it was found that the remarkable effect of reducing the eddy current loss in the stator 20 is exhibited if the percentage of the dimension Lt1 to the axial length of the tooth 26 is at least 0.5% and at most 4%.

Figure 11:
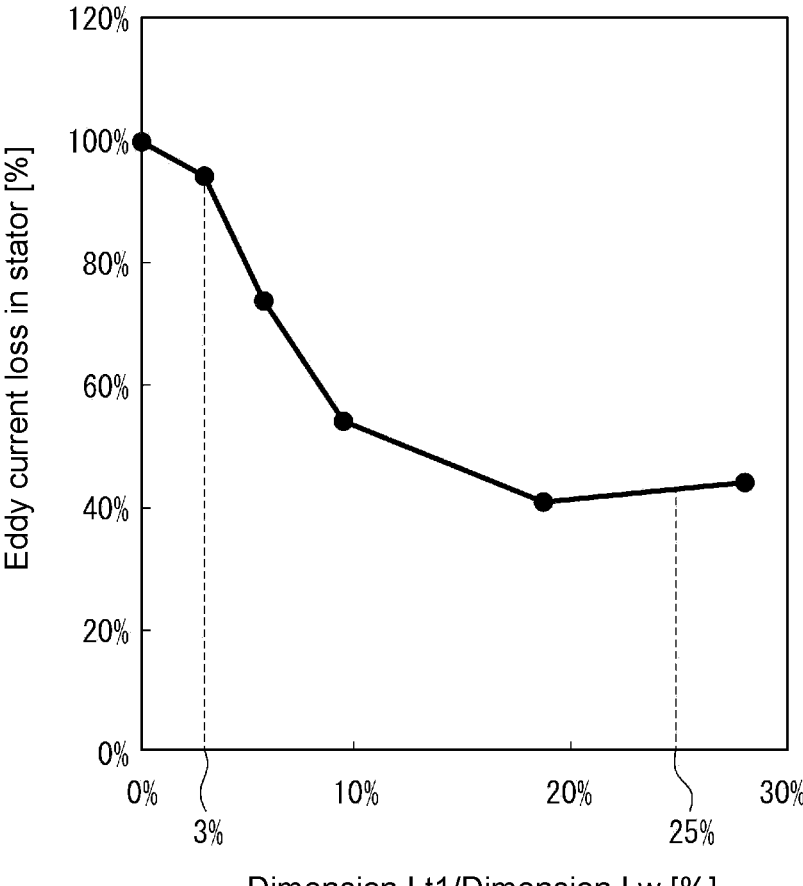
FIG. 11 is a second graph showing an eddy current loss depending on an axial distance from the finger end face to the tooth end face.

Next, as shown in the graph of FIG. 11, if the percentage of the dimension L2 to the opposing distance between the magnetic pole pieces 32 and the rotor 40 is at least 3%, the eddy current loss becomes at most 90%, and the remarkable effect of reducing the eddy current loss was confirmed. Further, it was found that the effect of reducing the eddy current loss does not improve even if the above-described percentage exceeds 25%. Therefore, it was found that the remarkable effect of reducing the eddy current loss in the stator 20 is exhibited if the percentage of the dimension Lw to the opposing distance between the magnetic pole pieces 31 and the rotor 40 is at least 3% and at most 25%.

Conclusion

Hereinafter, the overview of the magnetic geared rotating machine 10, the power generation system 1A, and the drive system 1B according to some embodiments will be described.

1) A magnetic geared rotating machine (10) according to at least one embodiment of the present disclosure, includes: a stator (20); a rotor (40) including a plurality of rotor magnets (42); and a magnetic pole piece rotor (30) including a plurality of magnetic pole pieces (31) each disposed at a radial position between the stator (20) and the rotor (40). Each of the magnetic pole pieces (31) has a magnetic pole piece end face (32A, 33A) facing one side in an axial direction. Each of the rotor magnets (42) has a rotor magnet end face (42A) facing the one side. At least part of the magnetic pole piece end face (32A, 33A) is located on the other side in the axial direction relative to the rotor magnet end face (42A), or a finger end face (29A), of each of a plurality of fingers (29), facing the one side is located on the other side relative to a tooth end face (26A), of a tooth (26) of the stator (20), facing the one side, the plurality of fingers (29) being configured to hold therebetween a stator magnet (22) disposed on the tooth (26) from both sides in a circumferential direction.

According to the findings of the present inventors, since the magnetic pole piece end face (32A, 33A) is located on the other side in the axial direction relative to the rotor magnet end face (42A), the eddy current loss in the magnetic pole piece (31) on the one side in the axial direction is reduced. Further, since the finger end face (29A) is located on the other side in the axial direction relative to the tooth end face (26A), the eddy current loss in the stator (20) on the one side in the axial direction is reduced. Therefore, according to the above configuration 1), it is possible to implement the magnetic geared rotating machine (10) in which the eddy current loss is reduced.

2) In some embodiments, the magnetic geared rotating machine (10) as defined in the above 1), wherein the stator (20) includes a plurality of the stator magnets (22), wherein each of the stator magnets (22) has a stator magnet end face (22A) facing the one side, and wherein the stator magnet end face (22A) is located on the other side relative to the rotor magnet end face (42A).

According to the findings of the present inventors, since the stator magnet end face (22A) is located on the other side in the axial direction relative to the rotor magnet end face (42A), it is possible to reduce the eddy current loss in the magnetic pole piece (31). Further, since the axial length of the stator magnet (22) can be reduced, the cost is reduced. Therefore, according to the above configuration 2), it is possible to implement the magnetic geared rotating machine (10) that achieves both the reduction in eddy current loss and the reduction in cost.

3) In some embodiments, the magnetic geared rotating machine (10) as defined in the above 2), wherein the stator magnet end face (22A) is disposed at the same axial position as the magnetic pole piece end face (32A, 33A) or at an axial position between the magnetic pole piece end face (32A, 33A) and the rotor magnet end face (42A).

According to the findings of the present inventors, the portion of the stator magnet (22) located on the one side relative to the magnetic pole piece end face (32A, 33A) hardly contributes to generation of magnetic transmission torque in the magnetic geared rotating machine (10). Therefore, according to the above configuration 3), it is possible to reduce the unnecessary stator magnets (22) hardly contributing to the generation of the magnetic transmission torque and it is possible to reduce the cost of the magnetic geared rotating machine (10).

4) In some embodiments, the magnetic geared rotating machine (10) as defined in the above 1), wherein at least the part of the magnetic pole piece end face (32A, 33A) is located on the other side relative to the rotor magnet end face (42A), and wherein the magnetic pole piece (31) includes: a stator side opposing face (36, 360) extending in the axial direction and opposing the stator (20); and a rotor side opposing face (37, 370) extending in the axial direction and opposing the rotor (40), and wherein the stator side opposing face (36, 360) is longer than the rotor side opposing face (37, 370) in the axial direction.

According to the above configuration 4), since the stator side opposing face (36, 360) is longer than the rotor side opposing face (37, 370) in the axial direction, the axial length of the stator side opposing face (36, 360) can be increased while at least the part of the magnetic pole piece end face (32A, 33A) is located on the other side in the axial direction relative to the rotor magnet end face (42A). Therefore, it is possible to suppress the reduction in transmission torque in the magnetic geared rotating machine (10) while suppressing the eddy current loss in the magnetic pole piece (31). Accordingly, the magnetic geared rotating machine (10) is implemented which is capable of reducing the eddy current loss as well as ensuring the magnetic transmission torque.

5) In some embodiments, the magnetic geared rotating machine (10) as defined in the above 4), wherein each of the magnetic pole pieces (31) includes a first magnetic pole piece end portion (331) which is an end portion on the one side, wherein the first magnetic pole piece end portion (331) has a plurality of electrical steel sheets (35) laminated such that radial positions of end portions (355A, 335B) on a side of the stator (20) are aligned, and wherein the plurality of electrical steel sheets (35) have: a first electrical steel sheet (35A) forming part of the rotor side opposing face (37, 370); and a second electrical steel sheet (35B) disposed at a radial position between the stator (20) and the rotor side opposing face (37, 370).

According to the above configuration 5), with the simple configuration where the plurality of electrical steel sheets (35) having the different radial lengths are laminated, it is possible to achieve both the reduction in eddy current loss and ensuring of the magnetic transmission torque.

6) In some embodiments, the magnetic geared rotating machine (10) as defined in the above 4) or 5), wherein the stator (20) includes a plurality of the stator magnets (22), wherein each of the stator magnets (22) has a stator magnet end face (22A) facing the one side, and wherein the stator magnet end face (22A) is disposed at the same axial position as an end (366A) of the stator side opposing face (36, 360) on the one side or at an axial position between the end (366A) of the stator side opposing face (36, 360) on the one side and an end (377A) of the rotor side opposing face (37, 370) on the one side.

According to the above configuration 6), since it is possible to reduce the portion of the stator magnet (22) that hardly contributes to the magnetic transmission torque, it is possible to reduce the cost of the magnetic geared rotating machine (10).

7) In some embodiments, the magnetic geared rotating machine (10) as defined in any of the above 1) to 6), wherein at least the part of the magnetic pole piece end face (32A, 33A) is located on the other side relative to the rotor magnet end face (42A), and wherein an axial distance (dimension La1, Lb1) from the magnetic pole piece end face (32A, 33A) to the rotor magnet end face (42A) is at least 0.5% of an axial length (dimension Lr) of the rotor magnet (42) and at most 10% of the axial length (dimension Lr) of the rotor magnet (42).

According to the findings of the present inventors, since the axial distance (dimension La1, Lb1) from the magnetic pole piece end face (32A, 33A) to the rotor magnet end face (42A) is at least 0.5% and at most 10% of the axial length (dimension Lr) of the rotor magnet (42), it is possible to improve the effect of reducing the eddy current loss in the magnetic pole piece (31). Therefore, according to the above configuration 7), the magnetic geared rotating machine (10) is implemented in which the eddy current loss is more effectively reduced.

8) In some embodiments, the magnetic geared rotating machine (10) as defined in any of the above 1) to 7), wherein at least the part of the magnetic pole piece end face (32A, 33A) is located on the other side in the axial direction relative to the rotor magnet end face (42A), wherein each of the magnetic pole pieces (31) opposes the rotor (40) with an air gap (second air gap G2) therebetween, and wherein an axial distance (dimension La1, Lb1) from the magnetic pole piece end face (32A, 33A) to the rotor magnet end face (42A) is at least 50% of an opposing distance (dimension Ls) between the magnetic pole piece (31) and the rotor (40) and at most 1200% of the opposing distance (dimension Ls).

According to the findings of the present inventors, since the axial distance (dimension La1, Lb1) from the magnetic pole piece end face (32A, 33A) to the rotor magnet end face (42A) is at least 50% and at most 1200% of the opposing distance (dimension Ls) between the magnetic pole piece (31) and the rotor (40), it is possible to improve the effect of reducing the eddy current loss in the magnetic pole piece (31). Therefore, according to the above configuration 8), the magnetic geared rotating machine (10) is implemented in which the eddy current loss is more effectively reduced.

9) In some embodiments, the magnetic geared rotating machine (10) as defined in any of the above 1) to 8), wherein the finger end face (29A) is located on the other side relative to the tooth end face (26A), and wherein an axial distance (dimension Lt1) from the finger end face (29A) to the tooth end face (26A) is at least 0.5% of an axial length (dimension Le) of the tooth (26) and at most 4% of the axial length (dimension Le) of the tooth (26).

According to the findings of the present inventors, since the axial distance (dimension Lt1) from the finger end face (29A) to the tooth end face (26A) is at least 0.5% and at most 4% of the axial length (dimension Le) of the tooth (26), it is possible to reduce the eddy current loss in the stator (20). Therefore, according to the above configuration 9), the magnetic geared rotating machine (10) is implemented in which the eddy current loss is more effectively reduced.

10) In some embodiments, the magnetic geared rotating machine (10) as defined in any of the above 1) to 9), wherein the finger end face (29A) is located on the other side relative to the tooth end face (26A), and wherein an axial distance (dimension Lt1) from the finger end face (29A) to the tooth end face (26A) is at least 3% of a circumferential length (dimension Lw) at a tip of the tooth (26) and at most 25% of the circumferential length (dimension Lw).

According to the findings of the present inventors, since the axial distance (dimension Lt1) from the finger end face (29A) to the tooth end face (26A) is at least 3% of the circumferential length (dimension Lw) at the tip of the tooth (26) and at most 25% of the circumferential length (dimension Lw) at the tip, it is possible to reduce the eddy current loss in the stator (20). Therefore, according to the above configuration 10), the magnetic geared rotating machine (10) is implemented in which the eddy current loss is more effectively reduced.

11) A power generation system (1) according to at least one embodiment of the present disclosure, includes: a prime mover (2); and the magnetic geared rotating machine (10) as defined in any of the above 1) to 10), which serves as a magnetic geared generator (10A) configured to be driven by an input from the prime mover (2) to generate electric power.

According to the above configuration 11), for the same reason described in the above 1), it is possible to implement the power generation system (1A) in which the eddy current loss is reduced.

12) A drive system (1B) according to at least one embodiment of the present disclosure, includes: the magnetic geared rotating machine (10) as defined in any of the above 1) to 10), which serves as a magnetic geared motor (10B) configured to output rotational power; and a drive part (8) configured to be driven by the rotational power output from the magnetic geared rotating machine (10).

According to the above configuration 12), for the same reason described in the above 1), it is possible to implement the drive system (1B) in which the eddy current loss is reduced.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1A: Power generation system
1B: Drive system
2: Prime mover
8: Drive part
10: Magnetic geared rotating machine
10A: Magnetic geared generator
10B: Magnetic geared motor
20: Stator

22: Stator magnet
22A: Stator magnet end face
26: Tooth
26A: Tooth end face
29: Finger
29A: Finger end face
30: Magnetic pole piece rotor
31: Magnetic pole piece
32A, 33A: Magnetic pole piece end face
35: Electrical steel sheet
35A: First electrical steel sheet
35B: Second electrical steel sheet
36, 360: Stator side opposing face
37, 370: Rotor side opposing face
40: Rotor
42: Rotor magnet
42A: Rotor magnet end face
331: First magnetic pole piece end portion
355A, 355B: End portion
377A, 377B: End
G2: Second air gap

The invention claimed is:

1. A magnetic geared rotating machine, comprising:
a stator;
a rotor including a plurality of rotor magnets; and
a magnetic pole piece rotor including a plurality of magnetic pole pieces each disposed at a radial position between the stator and the rotor,
wherein each of the magnetic pole pieces has a magnetic pole piece end face facing one side in an axial direction,
wherein each of the rotor magnets has a rotor magnet end face facing the one side,
wherein at least either of two relationships is established, one relationship being a relationship where at least part of the magnetic pole piece end face is disposed at an axial position between the rotor magnet end face and an axial center of the magnetic geared rotating machine, the other relationship being a relationship where a finger end face, of each of a plurality of fingers, facing the one side is disposed at an axial position between a tooth end face, of a tooth of the stator, facing the one side and the axial center of the magnetic geared rotating machine, the plurality of fingers being configured to hold therebetween a stator magnet disposed on the tooth from both sides in a circumferential direction,
wherein the stator includes a plurality of the stator magnets,
wherein each of the stator magnets has a stator magnet end face facing the one side,
wherein the stator magnet end face is disposed at an axial position between the rotor magnet end face and the axial center of the magnetic geared rotating machine, and
wherein the stator magnet end face is disposed at the same axial position as the magnetic pole piece end face or at an axial position between the magnetic pole piece end face and the rotor magnetic end face.

2. The magnetic geared rotating machine according to claim 1,
wherein at least the part of the magnetic pole piece end face is disposed at an axial position between the rotor magnet end face and the axial center of the magnetic geared rotating machine, and
wherein an axial distance from the magnetic pole piece end face to the rotor magnet end face is at least 0.5% of an axial length of the rotor magnet and at most 10% of the axial length of the rotor magnet.

3. The magnetic geared rotating machine according to claim 1,
wherein at least the part of the magnetic pole piece end face is disposed at an axial position between the rotor magnet end face and the axial center of the magnetic geared rotating machine,
wherein each of the magnetic pole pieces opposes the rotor with an air gap therebetween, and
wherein an axial distance from the magnetic pole piece end face to the rotor magnet end face is at least 50% of an opposing distance between the magnetic pole piece and the rotor and at most 1200% of the opposing distance.

4. The magnetic geared rotating machine, according to claim 1,
wherein the finger end face is disposed at an axial position between the tooth end face and the axial center of the magnetic geared rotating machine, and
wherein an axial distance from the finger end face to the tooth end face is at least 0.5% of an axial length of the tooth and at most 4% of the axial length of the tooth.

5. The magnetic geared rotating machine, according to claim 1,
wherein the finger end face is disposed at an axial position between the tooth end face and the axial center of the magnetic geared rotating machine, and
wherein an axial distance from the finger end face to the tooth end face is at least 3% of a circumferential length at a tip of the tooth and at most 25% of the circumferential length.

6. A power generation system, comprising:
a prime mover; and
the magnetic geared rotating machine according to claim 1, which serves as a magnetic geared generator configured to be driven by an input from the prime mover to generate electric power.

7. A drive system, comprising:
the magnetic geared rotating machine according to claim 1, which serves as a magnetic geared motor configured to output rotational power; and
a drive part configured to be driven by the rotational power output from the magnetic geared rotating machine.

8. A magnetic geared rotating machine, comprising:
a stator;
a rotor including a plurality of rotor magnets; and
a magnetic pole piece rotor including a plurality of magnetic pole pieces each disposed at a radial position between the stator and the rotor,
wherein each of the magnetic pole pieces has a magnetic pole piece end face facing one side in an axial direction,
wherein each of the rotor magnets has a rotor magnet end face facing the one side,
wherein at least either of two relationships is established, one relationship being a relationship where at least part of the magnetic pole piece end face is disposed at an axial position between the rotor magnet end face and an axial center of the magnetic geared rotating machine, the other relationship being a relationship where a finger end face, of each of a plurality of fingers, facing the one side is disposed at an axial position between a tooth end face, of a tooth of the stator, facing the one side and the axial center of the magnetic geared rotating machine, the plurality of fingers being configured to hold therebetween a stator magnet disposed on the tooth from both sides in a circumferential direction, wherein at least the part of the magnetic pole piece end face is located on the other side relative to the rotor magnet end face, wherein the magnetic pole piece includes:

a stator side opposing face extending in the axial direction and opposing the stator; and a rotor side opposing face extending in the axial direction and opposing the rotor, and wherein the stator side opposing face is longer than the rotor side opposing face in the axial direction.

9. The magnetic geared rotating machine according to claim 8, wherein each of the magnetic pole pieces includes a first magnetic pole piece end portion which is an end portion on the one side, wherein the first magnetic pole piece end portion has a plurality of electrical steel sheets laminated such that radial positions of end portions on a side of the stator are aligned, and wherein the plurality of electrical steel sheets have:

a first electrical steel sheet forming part of the rotor side opposing face; and a second electrical steel sheet disposed at a radial position between the stator and the rotor side opposing face.

10. The magnetic geared rotating machine according to claim 8, wherein the stator includes a plurality of the stator magnets, wherein each of the stator magnets has a stator magnet end face facing the one side, and wherein the stator magnet end face is disposed at the same axial position as an end of the stator side opposing face on the one side or at an axial position between the end of the stator side opposing face on the one side and an end of the rotor side opposing face on the one side.

* * * * *